United States Patent
Hart et al.

(10) Patent No.: US 8,407,179 B2
(45) Date of Patent: Mar. 26, 2013

(54) METHOD OF DETERMINING INFLUENCE OF A MEMBER WITHIN A DATASET

(75) Inventors: Christopher Hart, San Francisco, CA (US); Joseph Chandra Wilkerson, Gilroy, CA (US)

(73) Assignee: TRUEANTHEM Corporation, San Francisco, CA (US)

( * ) Notice: Subject to any disclaimer, the term of this patent is extended or adjusted under 35 U.S.C. 154(b) by 399 days.

(21) Appl. No.: 12/652,962

(22) Filed: Jan. 6, 2010

(65) Prior Publication Data
US 2010/0205220 A1    Aug. 12, 2010

Related U.S. Application Data

(60) Provisional application No. 61/142,881, filed on Jan. 6, 2009.

(51) Int. Cl.
*G06F 7/00* (2006.01)
(52) U.S. Cl. ............... 707/603; 707/797; 707/798
(58) Field of Classification Search .......... 707/603
See application file for complete search history.

(56) References Cited

U.S. PATENT DOCUMENTS

| | | | | |
|---|---|---|---|---|
| 5,794,178 | A * | 8/1998 | Caid et al. | 704/9 |
| 6,151,595 | A * | 11/2000 | Pirolli et al. | 1/1 |
| 6,804,675 | B1 * | 10/2004 | Knight et al. | 707/754 |
| 7,313,365 | B2 * | 12/2007 | Giacalone | 455/62 |
| 7,539,664 | B2 * | 5/2009 | Dutta et al. | 1/1 |
| 8,185,584 | B2 * | 5/2012 | Fischer et al. | 709/204 |
| 2002/0138471 | A1 * | 9/2002 | Dutta et al. | 707/3 |
| 2006/0004691 | A1 * | 1/2006 | Sifry | 707/1 |
| 2007/0214097 | A1 * | 9/2007 | Parsons et al. | 706/12 |
| 2008/0109306 | A1 * | 5/2008 | Maigret et al. | 705/14 |
| 2008/0215970 | A1 * | 9/2008 | Tsuji et al. | 715/702 |
| 2008/0256233 | A1 * | 10/2008 | Hall et al. | 709/224 |
| 2009/0030969 | A1 * | 1/2009 | Dutta et al. | 709/201 |
| 2009/0100456 | A1 * | 4/2009 | Hughes | 725/14 |
| 2010/0153404 | A1 * | 6/2010 | Ghosh et al. | 707/748 |

* cited by examiner

*Primary Examiner* — Tony Mahmoudi
*Assistant Examiner* — Michael Le
(74) *Attorney, Agent, or Firm* — Charter IP, LLC; Matthew J. Lattig

(57) ABSTRACT

A method of determining influence of a member within an overall dataset may include functions which capture, aggregate, analyze and visually present the relationships and influence that members of a dataset or collection, such as individual persons, websites, applications and/or machines, exercise over one another based on interaction, behavioral and demographic factors, etc. The calculated results of influence may be employed for the tracking of content and/or marketing, for example.

17 Claims, 28 Drawing Sheets

FIG. 7

```
<object type="application/x-shockwave-flash" allowScriptAccess="always" allowNetworking="all"
data="http://www.trueanthem.com/widget/swf/trackingTag.swf?WID=55741309&PID=60393650&OMID=841919134" height="400"
width="400"><param name="allowScriptAccess" value="always"><param name="allowNetworking" value="all"><param name="movie"
value="http://www.trueanthem.com/widget/swf/trackingTag.swf?WID=55741309&PID=60393650&OMID=841919134"><param
name="wmode" value="transparent"><param name="flashvars" value="WID=55741309&PID=60393650"></object><a href=""
target="_blank"><img src="http://www.trueanthem.com/img/trackingTag.gif?WID=55741309&PID=60393650&OMID=841919134" width="1"
height="1" border="0" alt=""></a>
```

FIG. 8A

| Event Types | Content Holder Id | Placement Id | Session Id | Content Location | Machine Id | Person Id | Parent Post Id | Item Id | Stream Event Id | Download Event Id |
|---|---|---|---|---|---|---|---|---|---|---|
| Load/Open | Yes | Yes | Yes | Yes | Yes | Yes | | | | |
| New Post / Publish / Share of Application or Content | Yes | Yes | Yes | Yes | Yes | Yes | Yes | | | |
| User Interaction | Yes | Yes | Yes | Yes | Yes | Yes | | Yes | | |
| Stream | Yes | Yes | Yes | Yes | Yes | Yes | | Yes | Yes | |
| View | Yes | Yes | Yes | Yes | Yes | Yes | | Yes | | |
| Download | Yes | Yes | Yes | Yes | Yes | Yes | | Yes | | Yes |
| Ad Impression | Yes | Yes | Yes | Yes | Yes | Yes | | Yes | | |
| Ad Click | Yes | Yes | Yes | Yes | Yes | Yes | | | | |
| e-Commerce | Yes | Yes | Yes | Yes | Yes | Yes | | Yes | | |
| Question Answered | Yes | Yes | Yes | Yes | Yes | Yes | | | | |

| Continuation from FIG. 8A / Event Types | Transaction Id | Order Id | Banner Ad Id | Advertiser Id | Campaign Id | Item File Id | Component Id | Question Id | Answer Text | Date/Time Stamp |
|---|---|---|---|---|---|---|---|---|---|---|
| Load/Open | | | | Yes | Yes | | | | | Yes |
| New Post / Publish / Share of Application or Content | | | | Yes | Yes | | | | | Yes |
| User Interaction | | | Yes | Yes | Yes | | Yes | | | Yes |
| Stream | | | | | | Yes | | | | Yes |
| View | | | | | | Yes | | | | Yes |
| Download | | | | | | Yes | | | | Yes |
| Ad Impression | | | Yes | Yes | | | | | | Yes |
| Ad Click | | | Yes | Yes | | | | | | Yes |
| e-Commerce | Yes | Yes | | Yes | Yes | | | | | Yes |
| Question Answered | | | | | | | | Yes | Yes | Yes |

See Fig. 9B

| Event Date Time | Event Log Id | Event Type Id | Content Holder Id | Placement Id | Session Id | Content Location |
|---|---|---|---|---|---|---|
| 11/6/08 5:27 PM | 25787948 | 1 | 1072177 | 1481467 | 13994795 | http://www.facebook.com/hartchris |
| 11/6/08 5:33 PM | 25788895 | 2 | 1072177 | 1481467 | 13994795 | http://www.facebook.com/hartchris |
| 11/6/08 5:34 PM | 25788979 | 3 | 1072177 | 1481467 | 13994795 | http://www.facebook.com/hartchris |
| 11/6/08 5:34 PM | 25789085 | 3 | 1072177 | 1481467 | 13994795 | http://www.facebook.com/hartchris |
| 11/6/08 5:35 PM | 25789172 | 3 | 1072177 | 1481467 | 13994795 | http://www.facebook.com/hartchris |
| 11/6/08 5:35 PM | 25789251 | 3 | 1072177 | 1481467 | 13994795 | http://www.facebook.com/hartchris |
| 11/6/08 5:36 PM | 25789334 | 3 | 1072177 | 1481467 | 13994795 | http://www.facebook.com/hartchris |
| 11/6/08 5:36 PM | 25789423 | 3 | 1072177 | 1481467 | 13994795 | http://www.facebook.com/hartchris |
| 11/6/08 5:37 PM | 25789511 | 3 | 1072177 | 1481467 | 13994795 | http://www.facebook.com/hartchris |
| 11/6/08 5:37 PM | 25789581 | 3 | 1072177 | 1481467 | 13994795 | http://www.facebook.com/hartchris |
| 11/6/08 5:37 PM | 25789637 | 3 | 1072177 | 1481467 | 13994795 | http://www.facebook.com/hartchris |

FIG. 9A

See Fig. 9C

| Machine Account Id | Person Id | Parent Placement Id | Item Id | Stream Event Id | Download Event Id | Transaction Id | Order Id | Banner Ad Id |
|---|---|---|---|---|---|---|---|---|
| 474628 | 1061 | NULL | NULL | NULL | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |
| 474628 | 1061 | NULL | 13016121 | 13995319 | NULL | NULL | NULL | NULL |

See Fig. 9A

*FIG. 9B*

| Advertiser Id | Campaign Id | Item File Id | IP Address | Question Id | Answer Text |
|---|---|---|---|---|---|
| 12962259 | 12962260 | NULL | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |
| 12962259 | 12962260 | 13016122 | NULL | NULL | NULL |

See Fig. 9B

| widgetId (WID) | placementId (PID) | parentPlacementId (PID) | Depth to Root | WidgetCreatedDateTime | postedByMachineId | postedByPersonId |
|---|---|---|---|---|---|---|
| 1000 | 6762544 | | 0 | | | |
| 1000 | 8851148 | 6762544 | 1 | 9/12/2008 19:04 | 68 | 3881649 |
| 1000 | 6785187 | 6762544 | 1 | 8/12/2008 22:04 | 68 | 3881649 |
| 1000 | 6798119 | 6785187 | 2 | 8/13/2008 1:36 | 1836645 | 8169299 |
| 1000 | 6830940 | 6785187 | 2 | 8/13/2008 14:18 | 1668692 | 7601836 |
| 1000 | 6830958 | 6785187 | 2 | 8/13/2008 14:19 | 1587470 | 7326120 |
| 1000 | 6831005 | 6785187 | 2 | 8/13/2008 14:19 | 1973912 | 8674163 |
| 1000 | 6851477 | 6785187 | 2 | 8/13/2008 18:39 | 2024900 | 10723691 |
| 1000 | 6855779 | 6785187 | 2 | 8/13/2008 19:40 | 2585004 | 10813784 |
| 1000 | 6862336 | 6785187 | 2 | 8/13/2006 21:18 | 2017564 | 8848418 |
| 1000 | 7426519 | 6862336 | 3 | 8/22/2008 13:03 | 2141497 | 9245845 |
| 1000 | 6865368 | 6785187 | 2 | 8/13/2008 22:04 | 2141497 | 9239227 |
| 1000 | 6875200 | 6785187 | 2 | 8/14/2008 0:27 | 2139021 | 9239227 |
| 1000 | 6875247 | 6785187 | 2 | 8/14/2008 0:27 | 2404819 | 10164673 |
| 1000 | 6928288 | 6785187 | 2 | 8/14/2008 19:46 | 2404819 | 10164673 |
| 1000 | 6970674 | 6785187 | 2 | 8/15/2008 12:40 | 2404819 | 10164673 |
| 1000 | 6970981 | 6970674 | 3 | 8/15/2008 12:45 | 2404819 | 10164673 |
| 1000 | 6970995 | 6970674 | 3 | 8/15/2008 12:46 | 2404819 | 10164673 |
| 1000 | 6971569 | 6785187 | 2 | 8/15/2008 12:56 | 2430887 | 10257043 |
| 1000 | 7318313 | 6971569 | 3 | 8/20/2008 19:48 | 2696803 | 11319175 |

FIG. 12

| Content Holder Id (WID) | Placement Id (PID) | Parent Placement Id (PPID) | Depth to Root | Node Created (Date Time) | Person / Machine Data | | Event Data At Node | | |
|---|---|---|---|---|---|---|---|---|---|
| | | | | | Node Originator Machine Id | Node Originator Person Id | Event Code 1 Occurrence | Event Code 2 Occurrence | Event Code X Occurrence |
| 1000 | 6762544 | | 0 | | 68 | 3881649 | 7823 | 5896 | 14057 |
| 1000 | 8851148 | 6762544 | 1 | 8/12/2008 19:04 | 68 | 3881649 | 0 | 0 | 0 |
| 1000 | 6785187 | 6762544 | 1 | 8/12/2008 22:04 | 68 | 3881649 | 1812 | 2748 | 733 |
| 1000 | 6798119 | 6785187 | 2 | 8/13/2008 1:36 | 1836645 | 8169299 | 0 | 1 | 2 |
| 1000 | 6830940 | 6785187 | 2 | 8/13/2008 14:18 | 1668692 | 7501836 | 0 | 0 | 0 |
| 1000 | 6830958 | 6785187 | 2 | 8/13/2008 14:19 | 1587470 | 7326120 | 0 | 0 | 0 |
| 1000 | 6831005 | 6785187 | 2 | 8/13/2008 14:19 | 1973912 | 8674163 | 0 | 25 | 4 |
| 1000 | 6851477 | 6785187 | 2 | 8/13/2008 18:39 | 2024900 | 10723691 | 0 | 0 | 48 |
| 1000 | 6855779 | 6785187 | 2 | 8/13/2008 19:40 | 2585004 | 10813784 | 0 | 0 | 82 |
| 1000 | 6862336 | 6785187 | 2 | 8/13/2008 21:18 | 2017564 | 8848418 | 0 | 1 | 15 |
| 1000 | 7426519 | 6862336 | 3 | 8/22/2008 13:03 | 2141497 | 9245845 | 0 | 0 | 1 |
| 1000 | 6865368 | 6785187 | 2 | 8/13/2008 22:04 | 2141497 | 9245845 | 0 | 0 | 0 |
| 1000 | 6875200 | 6785187 | 2 | 8/14/2008 0:27 | 2139021 | 9239227 | 0 | 0 | 1 |
| 1000 | 6875247 | 6785187 | 2 | 8/14/2008 0:27 | 2404819 | 10164673 | 0 | 0 | 5 |
| 1000 | 6928288 | 6785187 | 2 | 8/14/2008 19:46 | 2404819 | 10164673 | 0 | 0 | 0 |
| 1000 | 6970674 | 6785187 | 2 | 8/15/2008 12:40 | 2404819 | 10164673 | 41 | 22 | 36 |
| 1000 | 6970981 | 6970674 | 3 | 8/15/2008 12:45 | 2404819 | 10164673 | 0 | 0 | 0 |
| 1000 | 6970995 | 6970674 | 3 | 8/15/2008 12:46 | 2404819 | 10164673 | 0 | 0 | 376 |
| 1000 | 6971569 | 6785187 | 2 | 8/15/2008 12:56 | 2430887 | 10257043 | 5000 | 1495 | 10859 |

FIG. 13

| Content Holder Id (WID) | Placement Id (PID) | Parent Placement Id (PPID) | Depth to Root | Node Created (Date Time) | Person / Machine Data | | Event Data at Node & Linked Nodes | | | | | |
|---|---|---|---|---|---|---|---|---|---|---|---|---|
| | | | | | Node Originator Machine Id | Node Originator Person Id | Event Code 1 Occurrence | Event Code 1 Occurrence From Linked Nodes | Event Code 2 Occurrence | Event Code 2 Occurrence From Linked Nodes | Event Code X Occurrence | Event Code X Occurrence From Linked Nodes |
| 1000 | 6762544 | | 0 | | | 68 | 3881649 | 7823 | 5896 | 5896 | 14057 | |
| 1000 | 8851148 | 6762544 | 1 | 8/12/2008 19:04 | 68 | 3881649 | 0 | 0 | 0 | 0 | 0 |
| 1000 | 6785187 | 6762544 | 1 | 8/12/2008 22:04 | 68 | 3881649 | 1812 | 2748 | 2748 | 5821 | 733 | 13997 |
| 1000 | 6798119 | 6785187 | 2 | 8/13/2008 1:36 | 1836645 | 8169299 | 0 | 1 | 1 | 1 | 2 | 2 |
| 1000 | 6830940 | 6785187 | 2 | 8/13/2008 14:18 | 1658692 | 7601836 | 0 | 0 | 0 | 0 | 0 | 0 |
| 1000 | 6830958 | 6785187 | 2 | 8/13/2008 14:19 | 1587470 | 7326120 | 0 | 0 | 0 | 0 | 0 | 0 |
| 1000 | 6831005 | 6785187 | 2 | 8/13/2008 14:19 | 1973912 | 8674163 | 0 | 25 | 25 | 25 | 4 | 4 |
| 1000 | 6851477 | 6785187 | 2 | 8/13/2008 18:39 | 2024900 | 10723691 | 0 | 0 | 0 | 0 | 48 | 48 |
| 1000 | 6855779 | 6785187 | 2 | 8/13/2008 19:40 | 2585004 | 10813784 | 0 | 0 | 0 | 0 | 82 | 82 |
| 1000 | 6862336 | 6785187 | 2 | 8/13/2008 21:18 | 2017564 | 8848418 | 0 | 1 | 1 | 1 | 15 | 16 |
| 1000 | 7426519 | 6862336 | 3 | 8/22/2008 13:03 | 2141497 | 9245845 | 0 | 0 | 0 | 0 | 1 | 1 |
| 1000 | 6865368 | 6785187 | 2 | 8/13/2008 22:04 | 2141497 | 9245845 | 0 | 0 | 0 | 0 | 0 | 0 |
| 1000 | 6875200 | 6785187 | 2 | 8/14/2008 0:27 | 2139021 | 9239227 | 0 | 0 | 0 | 0 | 1 | 1 |
| 1000 | 6875247 | 6785187 | 2 | 8/14/2008 0:27 | 2404819 | 10164673 | 0 | 0 | 0 | 0 | 5 | 5 |
| 1000 | 6928288 | 6785187 | 2 | 8/14/2008 19:46 | 2404819 | 10164673 | 0 | 0 | 0 | 0 | 0 | 0 |
| 1000 | 6970674 | 6785187 | 2 | 8/15/2008 12:40 | 2404819 | 10164673 | 41 | 22 | 22 | 22 | 36 | 412 |
| 1000 | 6970981 | 6970674 | 3 | 8/15/2008 12:45 | 2404819 | 10164673 | 0 | 0 | 0 | 0 | 0 | 0 |
| 1000 | 6970995 | 6970674 | 3 | 8/15/2008 12:46 | 2404819 | 10164673 | 0 | 0 | 0 | 0 | 376 | 346 |
| 1000 | 6971569 | 6785187 | 2 | 8/15/2008 12:56 | 2430887 | 10257043 | 5000 | 1495 | 1495 | 1684 | 10859 | 11447 |

See Fig. 14B        See Fig. 14B

| Content Holder Id (WID) | Placement Id (PID) | Parent Placement Id (PPID) | Depth to Root | Node Created (Date Time) | Content Location Type | Content Location Served Location Url | Originator Machine Id |
|---|---|---|---|---|---|---|---|
| 1000 | 6762544 |  | 0 |  | Web Page | www.facebook.com/uvs | 68 |
| 1000 | 8851148 | 6762544 | 1 | 8/12/2008 19:04 | Web Page |  | 68 |
| 1000 | 6785187 | 6762544 | 1 | 8/12/2008 22:04 | Web Page |  | 68 |
| 1000 | 6798119 | 6785187 | 2 | 8/13/2008 1:36 | Web Page |  | 1836645 |
| 1000 | 6830940 | 6785187 | 2 | 8/13/2008 14:18 | Web Page | www.facebook.com/uvs | 1668692 |
| 1000 | 6830958 | 6785187 | 2 | 8/13/2008 14:19 | Web Page |  | 1587470 |
| 1000 | 6831005 | 6785187 | 2 | 8/13/2008 14:19 | Web Page |  | 1973912 |
| 1000 | 6851477 | 6785187 | 2 | 8/13/2008 18:39 | Web Page |  | 2024900 |
| 1000 | 6855779 | 6785187 | 2 | 8/13/2008 19:40 | Web Page |  | 2585004 |
| 1000 | 6862336 | 6785187 | 2 | 8/13/2008 21:18 | Web Page |  | 2017564 |
| 1000 | 7426519 | 6862336 | 3 | 8/22/2008 13:03 | Web Page |  | 2141497 |
| 1000 | 6865368 | 6785187 | 2 | 8/13/2008 22:04 | Web Page |  | 2141497 |
| 1000 | 6875200 | 6785187 | 2 | 8/14/2008 0:27 | Web Page |  | 2139021 |
| 1000 | 6875247 | 6785187 | 2 | 8/14/2008 0:27 | Web Page |  | 2404819 |
| 1000 | 6928288 | 6785187 | 2 | 8/14/2008 19:46 | Web Page |  | 2404819 |
| 1000 | 6970674 | 6785187 | 2 | 8/15/2008 12:40 | Web Page |  | 2404819 |
| 1000 | 6970981 | 6970674 | 3 | 8/15/2008 12:45 | Web Page |  | 2404819 |
| 1000 | 6970995 | 6970674 | 3 | 8/15/2008 12:46 | Web Page | www.facebook.com/index.html | 2404819 |
| 1000 | 6971569 | 6785187 | 2 | 8/15/2008 12:56 | Web Page |  | 2430887 |
| 1000 | 7318313 | 6971569 | 3 | 8/20/2009 19:48 | Web Page |  | 2696803 |

*FIG. 14A*

| Posted by Machine IP | Posted by Machine Zip Code | Posted by Machine Country | Posted by Machine Region | Posted by Machine City | Posted by Person Id | Posted by Person Email Address |
|---|---|---|---|---|---|---|
| 66.124.11.260 | 94133 | UNITED STATES | CALIFORNIA | SAN FRANCISCO | 3881649 | person1@gmail.com |
| 66.124.11.260 | 94133 | UNITED STATES | CALIFORNIA | SAN FRANCISCO | 3881649 | person1@gmail.com |
| 66.124.11.260 | 94133 | UNITED STATES | CALIFORNIA | SAN FRANCISCO | 3881649 | person1@gmail.com |
| 172.16.254.1 | 94109 | UNITED STATES | CALIFORNIA | SAN FRANCISCO | 8169299 | person1@yahoo.com |
| 129.215.0.20 | 0 | | | | 7601836 | person2@yahoo.com |
| 24.73.42.227 | 78214 | UNITED STATES | FLORIDA | ST.PETERSBURG | 7326120 | person3@yahoo.com |
| 61.246.240.157 | 37814 | UNITED STATES | TENNESSEE | MORRISTOWN | 8674163 | person4@yahoo.com |
| 99.196.116.7 | 42240 | UNITED STATES | KENTUCKY | HOPKINSVILLE | 10723691 | person2@gmail.com |
| 71.165.30.46 | 76244 | UNITED STATES | TEXAS | KELLER | 10813784 | person3@gmail.com |
| 220.150.50.92 | | JAPAN | TOKYO | TOKYO | 8848418 | person4@gmail.com |
| 67.140.230.61 | 30512 | UNITED STATES | GEORGIA | BLAIRSVILLE | 9245845 | person5@yahoo.com |
| 189.100.67.69 | 0 | BRAZIL | SAO PAULO | SAO PAULO | 9245845 | person5@yahoo.com |
| 58.94.92.253 | 63101 | UNITED STATES | MISSOURI | ST.LOUIS | 9239227 | person6@yahoo.com |
| 75.3.66.232 | 60290 | UNITED STATES | ILLINOIS | CHICAGO | 10164673 | person7@yahoo.com |
| 75.3.66.232 | 60290 | UNITED STATES | ILLINOIS | CHICAGO | 10164673 | person7@yahoo.com |
| 75.3.66.232 | 60290 | UNITED STATES | ILLINOIS | CHICAGO | 10164673 | person7@yahoo.com |
| 75.3.66.232 | 60290 | UNITED STATES | ILLINOIS | CHICAGO | 10164673 | person7@yahoo.com |
| 189.100.67.69 | | BRAZIL | SAO PAULO | SAO PAULO | 10257043 | person8@yahoo.com |
| 172.17.3.248 | 94109 | UNITED STATES | CALIFORNIA | SAN FRANCISCO | 11319175 | person9@yahoo.com |

See Fig. 14A    See Fig. 14A

| Content Holder Id (WID) | Placement Id (PID) | Parent Placement Id (PPID) | Depth to Root | Node Created Date Time | Node Originator Machine Id | Node Originator Person Id | Event Code X Node Occurrence | Event Code X Occurrence From Linked Nodes |
|---|---|---|---|---|---|---|---|---|
| 1000 | 6762544 | | 0 | | 68 | 3881649 | 14057 | |
| 1000 | 8851148 | 6762544 | 1 | 8/12/2008 19:04 | 68 | 3881649 | 0 | 0 |
| 1000 | 6785187 | 6762544 | 1 | 8/12/2008 22:04 | 68 | 3881649 | 733 | 13997 |
| 1000 | 6798119 | 6785187 | 2 | 8/13/2008 1:36 | 1836645 | 8169299 | 2 | 2 |
| 1000 | 6830940 | 6785187 | 2 | 8/13/2008 14:18 | 1668692 | 7601836 | 0 | 0 |
| 1000 | 6830958 | 6785187 | 2 | 8/13/2008 14:19 | 1587470 | 7326120 | 0 | 0 |
| 1000 | 6831005 | 6785187 | 2 | 8/13/2008 14:19 | 1973912 | 8674163 | 4 | 4 |
| 1000 | 6851477 | 6785187 | 2 | 8/13/2008 18:39 | 2024900 | 10723691 | 48 | 48 |
| 1000 | 6855779 | 6785187 | 2 | 8/13/2008 19:40 | 2585004 | 10813784 | 82 | 82 |
| 1000 | 6862336 | 6785187 | 2 | 8/13/2008 21:18 | 2017564 | 8848418 | 15 | 16 |
| 1000 | 7426519 | 6862336 | 3 | 8/22/2008 13:03 | 2141497 | 9245845 | 1 | 1 |
| 1000 | 6865368 | 6785187 | 2 | 8/13/2008 22:04 | 2141497 | 9245845 | 0 | 0 |
| 1000 | 6875200 | 6785187 | 2 | 8/14/2008 0:27 | 2139021 | 9239227 | 1 | 1 |
| 1000 | 6875247 | 6785187 | 2 | 8/14/2008 0:27 | 2404819 | 10164673 | 5 | 5 |
| 1000 | 6928288 | 6785187 | 2 | 8/14/2008 19:46 | 2404819 | 10164673 | 0 | 0 |
| 1000 | 6970674 | 6785187 | 2 | 8/15/2008 12:40 | 2404819 | 10164673 | 36 | 412 |
| 1000 | 6970981 | 6970674 | 3 | 8/15/2008 12:45 | 2404819 | 10164673 | 0 | 0 |
| 1000 | 6970995 | 6970674 | 3 | 8/15/2008 12:46 | 2404819 | 10164673 | 376 | 346 |
| 1000 | 6971569 | 6785187 | 2 | 8/15/2008 12:56 | 2430887 | 10257043 | 10859 | 11447 |
| 1000 | 7318313 | 6971569 | 3 | 8/20/2009 19:48 | 2696803 | 11319175 | 68 | 68 |

FIG. 18

| Node Originator Machine Id | Node Originator Person Id | Depth to Root | Node Created Date Time | Event Code X Occurrence From Linked Nodes |
|---|---|---|---|---|
| 68 | 3881649 | 0 | | 14057 |
| 1836645 | 8169299 | 1 | 8/13/2008 1:36 | 2 |
| 1668692 | 7601836 | 1 | 8/13/2008 14:18 | 0 |
| 1587470 | 7326120 | 1 | 8/13/2008 14:19 | 0 |
| 1973912 | 8674163 | 1 | 8/13/2008 14:19 | 4 |
| 2024900 | 10723691 | 1 | 8/13/2008 18:39 | 48 |
| 2585004 | 10813784 | 1 | 8/13/2008 19:40 | 82 |
| 2017564 | 8848418 | 1 | 8/13/2008 21:18 | 16 |
| 2141497 | 9245845 | 1 | 8/22/2008 13:03 | 1 |
| 2139021 | 9239227 | 1 | 8/14/2008 0:27 | 1 |
| 2404819 | 10164673 | 1 | 8/14/2008 0:27 | 417 |
| 2430887 | 10257043 | 1 | 8/15/2008 12:56 | 11447 |
| 2696803 | 11319175 | 2 | 8/20/2009 19:48 | 68 |

FIG. 19

| Node Originator Machine Id | Node Originator Person Id | Depth to Root | Node Created Date Time | Event Code X Occurrence From Linked Nodes | Node Influence Factor |
|---|---|---|---|---|---|
| 68 | 3881649 | 0 | | 14057 | 53.8% |
| 1836645 | 8169299 | 1 | 8/13/2008 1:36 | 2 | 0.0% |
| 1668692 | 7601836 | 1 | 8/13/2008 14:18 | 0 | 0.0% |
| 1587470 | 7326120 | 1 | 8/13/2008 14:19 | 0 | 0.0% |
| 1973912 | 8674163 | 1 | 8/13/2008 14:19 | 4 | 0.0% |
| 2024900 | 10723691 | 1 | 8/13/2008 18:39 | 48 | 0.2% |
| 2585004 | 10813784 | 1 | 8/13/2008 19:40 | 82 | 0.3% |
| 2017564 | 8848418 | 1 | 8/13/2008 21:18 | 16 | 0.1% |
| 2141497 | 9245845 | 1 | 8/22/2008 13:03 | 1 | 0.0% |
| 2139021 | 9239227 | 1 | 8/14/2008 0:27 | 1 | 0.0% |
| 2404819 | 10164673 | 1 | 8/14/2008 0:27 | 417 | 1.6% |
| 2430887 | 10257043 | 1 | 8/15/2008 12:56 | 11447 | 43.8% |
| 2696803 | 11319175 | 2 | 8/20/2009 19:48 | 68 | 0.3% |

METHOD OF DETERMINING INFLUENCE OF A MEMBER WITHIN A DATASET

PRIORITY STATEMENT

The present application claims the benefit under 35 U.S.C. §119(e) of U.S. Provisional Patent Application No. 61/142,881 to the inventors, filed Jan. 6, 2009, the entire contents of which is hereby incorporated by reference herein.

BACKGROUND

1. Field

Example embodiments in general relate to methods of determining influence of a member within an overall dataset in which a plurality of nodes exist, in which the member is represented by one of the nodes in the dataset.

2. Related Art

The following terms, briefly described hereafter, characterize features of the prior art that are relevant to the example embodiments. In computer science, a data structure is an organized collection of data, which may include information about the relationships existing between various members of the collection. In computer science, an Abstract Data Type (ADT) is a set of data together with the operations upon that data. The three fundamental types of ADT are List, Tree and Graph.

A list consists of nodes (containing data) and links between these nodes. A list is thus a "linear" representation of information. Each node in a list has at most one predecessor and at most one successor and may contain two components of information, a "data-component" and a "next-pointer". A node may be an ordered list of information (data, next-pointer). A list may start with a pointer to the first node on the list. Each subsequent node then may have a pointer to the successor node of that node. The last node of the list should contain a next-pointer value of "NULL" to represent that it is the last node on the list.

Specific types of lists include: Single Linked Lists, Double Linked Lists, Queues, Circular Queues, and Stacks. Operations upon lists include: insert, delete, find and update; special operations for stacks include top, push, pop and flush.

A tree also consists of nodes. Similar to a list, the nodes of a tree can be represented as having two types of components, data and pointers. However, for a tree there may be more than one pointer field. A "binary tree" has two pointer fields called "left child" and "right child". In general a tree may have any number of children, but trees with two children (binary trees) are widely used.

A tree node can be said to have at most one predecessor (the root node has no predecessor) but may have any number of successor nodes. Also, in the case of trees, predecessor nodes may be referred to as "parent" nodes, and successor nodes as "children".

FIG. 1 is a block diagram illustrating a conventional tree structure. A term related to trees is the "tree height". The height of a tree is the largest value derived from counting the parents of all the nodes. In FIG. 1, there is shown a tree structure or tree 10 which has a root node 12 with no predecessor. The root node 12 includes a left sub tree pointer 14 and a right sub tree pointer 15. The left sub tree pointer 14 points to a successor node 24 and the right sub tree pointer 15 points to a successor node 25. Successor node 24 spawns two additional successor nodes 34 and 36, while successor node 25 spawns an additional successor node 36. The height of the tree 10 is 2. The height is also sometimes referred to as the depth.

A graph consists of nodes which have a data component and pointer components. A graph is the most general of the three fundamental data structure types. A graph node may have any number of successor nodes as well as any number of predecessor nodes (a tree node may have at most one predecessor).

FIG. 2 is a block diagram illustrating a conventional graph structure. Within the field of graph theory, there are two fundamentally different types of graphs, "directed" and "undirected"; directed graphs being discussed herein. A directed graph has the sense that two nodes are linked together in an "ordered" fashion, so that a link between two nodes is "from" the predecessor node and "to" the successor node. As shown in FIG. 2 in the graph 20, nodes 42 which have only successors are called "source" nodes. Nodes 44 which have only predecessors are called "sink" nodes. When discussing graphs, references to nodes such as "parent" or "child" are avoided.

A tree may be considered to be a graph which contains no cycles. Hence a tree is a special type of graph. A cycle is a relationship between two or more nodes in which it is possible to return to the starting point without retracing steps. So if one proceeds from node A to node B and then from node B to node C, and further if one proceeds from node C to node A, the member has completed a "cycle". A cycle is valid in a graph but not valid in a tree.

SUMMARY

An example embodiment is directed to a method of determining influence of a member within an overall dataset in which a plurality of nodes exist, the member represented by one of the nodes in the dataset. In the method a root originator node is provided to a location directly or indirectly accessible to a central server. The root originator node is embodied by content and one or more tracking tags that identify the root node. The root node is configured to invoke a movement action resulting in the publishing of a-new successor nodes to a new location directly or indirectly accessible to the central server, the new successor nodes receiving a new instance of the content, tracking tags identifying the successor node, and an ability to invoke the movement action to generate additional successor nodes. The additional successor nodes are generated by invoking the movement action to pass on a new instance of the content with tracking tags identifying the successor nodes, with each additional successor node configured to serve as a distinct originator node for subsequently generated nodes with content and tracking tags identifying the subsequently generated nodes. Raw data from one or more events invoked at each node is captured after a node has been generated. The originator and successor nodes are assembled into a tree data structure. The tree structure is transformed into a graph data structure by aggregating event data based on one or more of the tracking tags to provide a dataset with established connections between all members thereof. An influence factor is calculated from the graph data structure that reflects the member's influence within the dataset.

Another example embodiment is directed to a method of determining influence of a member within an overall dataset in which a plurality of nodes exist, the member represented by one of the nodes in the dataset. In the method a root originator node is published to a location directly or indirectly accessible to a central server, the root node having content and a plurality of tracking tags comprising primary and alternate keys identifying the root node. One or more successor nodes are created at locations accessible to the central server by the root node performing one of a sharing, forwarding, posting, installing or passing along action of the content with tracking tags identifying the successor nodes in order to publish a successor node to a new location. Each of the successor nodes is configured to serve as a distinct originator node in generating additional successor nodes with the content and tracking tags identifying the additional successor nodes that are linked thereto. Raw data from one or more events invoked at each node is captured after a node has been created, and the nodes are assembled into a tree data structure based on the primary keys and captured raw data of the originator nodes. The method includes aggregating, for each node of a tree structure, the raw data captured from an event at each originator node and rollup event occurrences transpiring at linked nodes to form a tree structure with aggregated data, and transforming the tree structure into a graph data structure by aggregating event data based on the alternate keys of the originator nodes to provide a dataset with established connections between all members thereof. An influence factor is calculated from the graph data structure reflecting the member's influence within the dataset.

Another example embodiment is directed to a method of tracking viral spread of content across a plurality of nodes of a dataset to determine influence of a member within the overall dataset, the member represented by one of the nodes in the dataset. In the method a root originator node is published to a location accessible to a central server, the root node having content and a plurality of tracking tags composed of primary and alternate keys that identify the root node. One or more successor nodes are created at locations accessible to the central server by the root node performing a movement action resulting in the publishing of a new successor node with the content and tracking tags identifying the successor node to a new location accessible to the central server. Each of the successor nodes is configured to serve as a distinct originator node in generating additional successor nodes with the content and tracking tags identifying the additional successor nodes that are linked thereto. Raw data from one or more events invoked at each node is captured after a node has been created. The originator and successor nodes are assembled into a tree data structure. The tree structure is transformed into a graph data structure by aggregating event data based on at least a common ID contained within the alternate keys of the originator nodes to provide a dataset with established connections between all members thereof. An influence factor is calculated from the graph data structure reflecting the member's influence within the dataset.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

FIG. 6 is a block diagram illustrating each node's ability to publish multiple successor nodes there from.

FIG. 7 is a code portion illustrating the unique identifier keys of a tracking tag.

FIGS. 8A and 8B represent a table illustrating example event codes signifying events for capturing raw data in accordance with the example embodiments.

FIGS. 9A through 9C represent a table illustrating captured raw event data associated with a single node visitor session.

FIG. 10 is a table illustrating example tree data nodes and associated data fields used to assemble the raw tree data structure.

FIG. 12 is a table illustrating sample node originator data and raw aggregated event data occurring at each node across all visitor sessions associated with the node.

FIG. 13 is a table illustrating raw linked node rollup event data for each node of the tree.

FIGS. 14A and 14B depict a table of data illustrating an example of joining external, supporting data sources to each node of the tree.

FIG. 16 is a table with example node breakout to illustrate relationship of the metadata and aggregated event data to the transformation.

FIG. 18 is a table to illustrate a node's compound influence.

FIG. 19 is a table to illustrate influence factors for various nodes.

DETAILED DESCRIPTION

As to be set forth more fully below, the example embodiments in general are directed to a method of determining influence of a member within an overall dataset. The example method may include functions which capture, aggregate, analyze and visually present the relationships and the influence that members of a dataset or collection, such as individual persons, websites, applications and/or machines, exercise over one another based on interaction, behavioral and demographic factors, for example. The calculated results of influence may be employed for the tracking of content and/or marketing campaigns, for example.

In the example method to be described in further detail hereafter, an apparatus is created that includes a content holder holding content (such as a web page, web widget, application or an email), a tracking mechanism (such as a tracking tag), and a sharing/forwarding/posting/pass-along mechanism that is invoked as a "movement action" and which is associated with the apparatus. The apparatus may be published or shared with other potential viewers of the content, who in turn may publish or share the apparatus with further viewers. Data is captured along with the use and/or spread of the apparatus. The captured data is assembled and re-formulated into a given data structure. The data structure is subject to a multivariate influence analysis to calculate an influence factor. The influence factor may be reported via a desired visual interface.

As used herein, the phrase "originator node" will generally refer to a node from which has published or been generated one or more successor nodes. Where used, the phrase "root originator node" may be understood as an originator node which has no predecessor and is synonymous with "root node". A successor node in itself can be an originator node as it can generate one or more additional successor nodes. A successor node is synonymous with a sibling or child node in that each has an originator or parent node.

Figure 2:
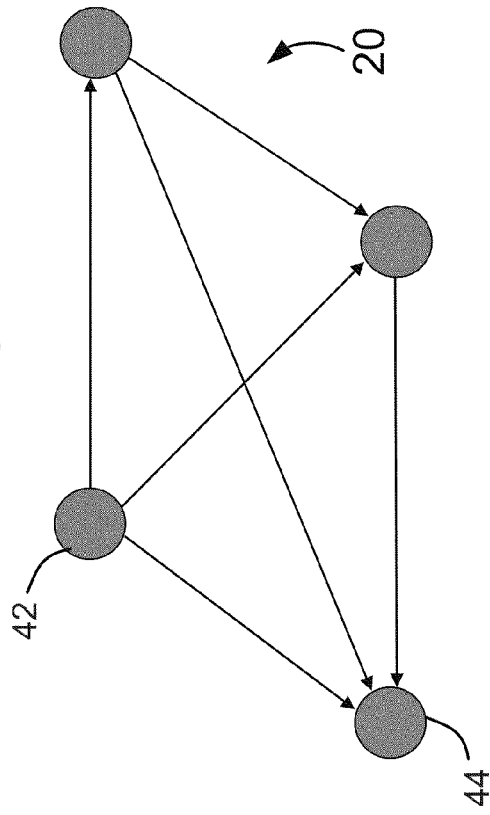
FIG. 2 is a block diagram illustrating a conventional graph structure.
Figure 1:
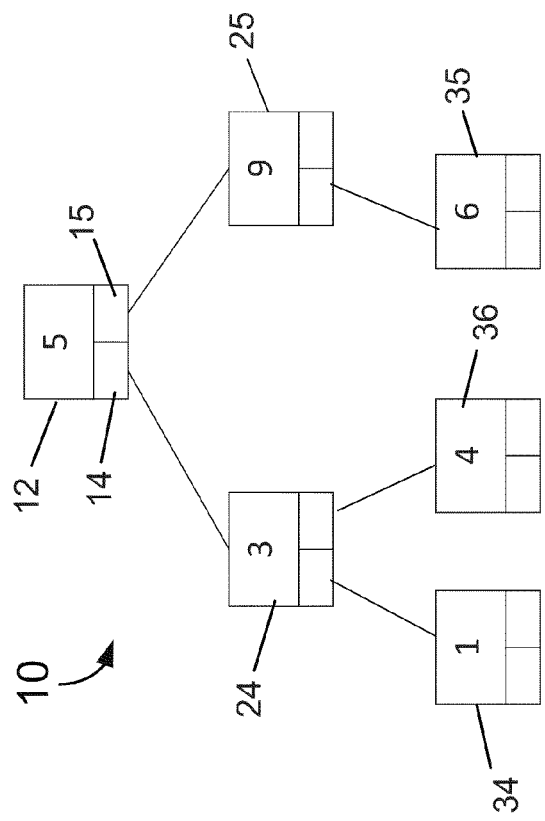
FIG. 1 is a block diagram illustrating a conventional tree structure.
Figure 3:
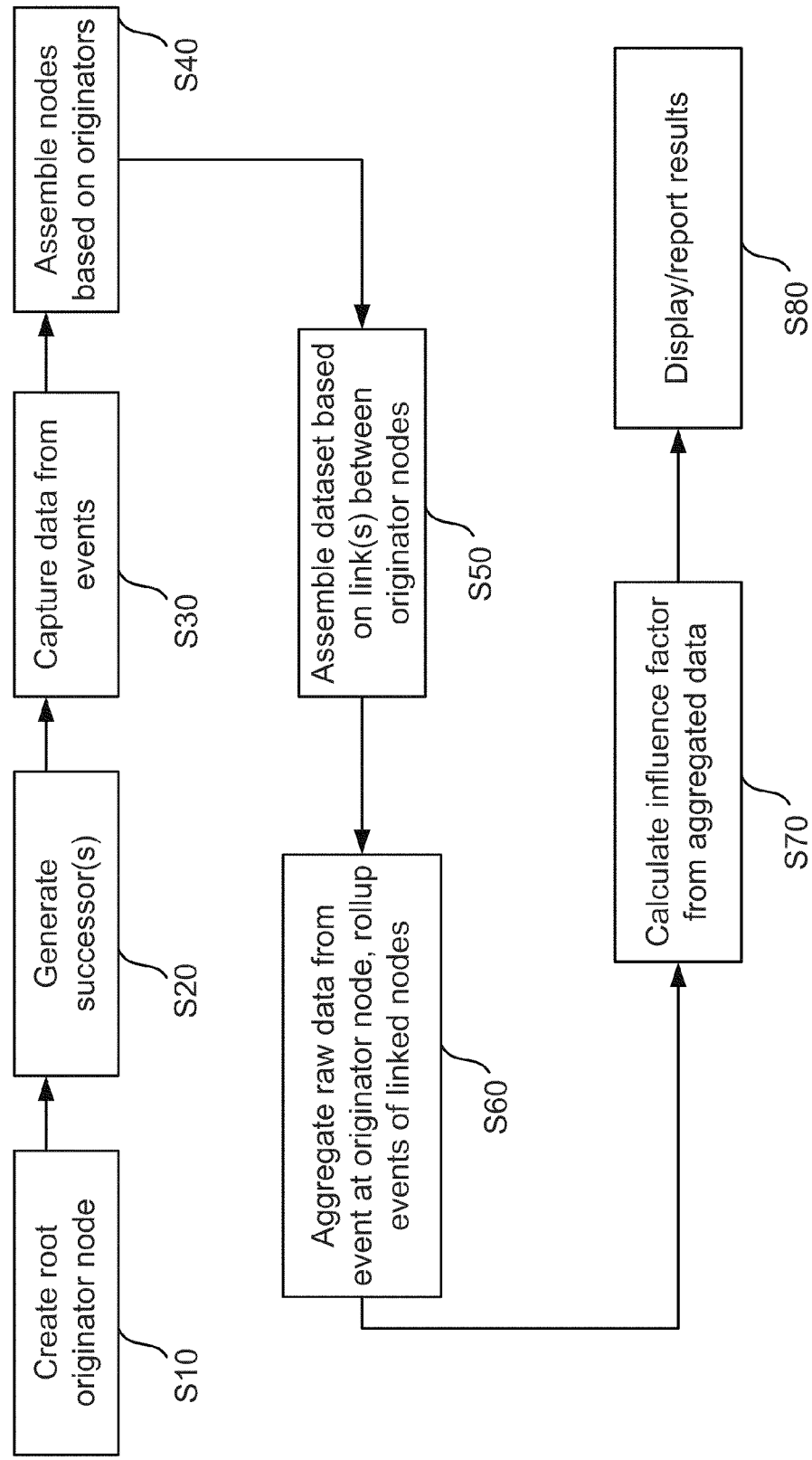
FIG. 3 is a flow diagram illustrating a method of determining influence of a person within an overall dataset in accordance with an example embodiment of the present invention.

FIG. 3 is a flow diagram illustrating a method of determining influence of a person within an overall dataset in accordance with an example embodiment of the present invention. Referring to FIG. 3, a root originator node ("root node") is created, customized and configured with content (S10) to appear at a location accessible to a central server. The root originator node is directly and/or indirectly in communication with the central server; the central server may or may not be accessible to the internet and/or on the web itself; it may be accessible by communication means other than the internet.

For example, a "holder" apparatus may be first created based on a pre-defined template and the first instance of the apparatus is called the root node. The apparatus in the first instance, hereafter "apparatus" includes a content holder, a tracking mechanism such as one or more tracking tags, and is configured to invoke a movement action to create new nodes having additional instances of the apparatus (i.e., the content holder, tracking tags, movement action to create additional successor nodes, etc.). The first instance of the apparatus and the root originator node are considered to be synonymous; subsequently generated successor nodes are created by originator nodes which in doing so pass on the apparatus in a second instance, third instance, Nth instance, etc.

The content holder of the apparatus may be embodied as any of a web widget, electronic mail message, mobile application, rich internet application ("RIA"), SMS message, MMS message, web application, web page, block of web content, block of mobile content, web advertisement, mobile advertisement and desktop application, for example. A widget can be understood as a portable chunk of code that can be installed and executed within any separate HTML-based web page by an end user without requiring additional compilation. Widgets are derived from the idea of code reuse. Other terms used to describe web widgets include: gadget, badge, module, webjit, capsule, snippet, mini and flake. Web widgets usually but not always use DHTML, JavaScript, or Adobe Flash.

Unique keys (also referred to as 'primary keys') are generated from the central server to uniquely reference the root node, and the tracking tags are used to follow the apparatus and capture interaction with the root node. Alternate keys are also generated to capture supporting data associated with the root node, such as the person who created the root node.

The root node is configured to invoke the aforementioned movement action resulting in the publishing or generation of one or more new node(s) (S20), called "successor nodes" to a new location that is directly and/or indirectly accessible to the central server. The new successor nodes may also be directly and/or indirectly accessible to the internet or on the web themselves. Each successor node is published or generated due to the movement action, which may be embodied by any of a sharing, forwarding, posting, installing or passing along of a new instance of the apparatus in order to publish the successor node to the new location. As to be illustrated in further detail below, each successor node in turn is configured to serve as a distinct originator node with the capability of generating additional successor nodes by invoking the movement action.

Once the root node has been published, raw data from events invoked at the root node and each successor node is captured (S30). In an example, the central server captures and stores raw data as events are invoked by a given node. Each active node (i.e., a published node with its tracking mechanism in communication with a central server) reports unique tracking data to central servers such as raw web traffic data and event data, for example.

The various successor nodes are assembled (S40) based on the originator of each given node. As to be described in more detail hereafter, the nodes are assembled into a tree data structure based on primary keys in the tracking tags. An association is made amongst all the originator nodes in order to assemble the complete dataset (S50). As to be described in more detail hereafter, the association between originator nodes involves transforming the tree structure into a graph based on common alternate keys in the tracking tags.

The raw data captured from an event at each originator node and rollup event occurrences transpiring at linked successor nodes is aggregated to achieve an aggregated data set (S60). It is noted that aggregation of event data can be performed in various orders prior to or after transforming the tree structure into the graph. For example, event data for each give node can be aggregated; the hierarchical tree structure assembled at step S40 and then sibling event data at each node in the tree rolled up before assembling the complete dataset at step S60). In other words, the sequence of aggregation functions can be separated at different points before or after transformation of the assembled hierarchical tree structure into the graph.

From the aggregated data, an influence factor may be calculated (S70). In an example the influence factor may reflect a member's influence on the dataset. In one example the member may be an individual person, machine, website or application. Moreover, the influence factor may reflect the relationships and/or influence members of a dataset exercise over other members of the same dataset based on interaction, behavioral and demographic factors, for example.

The calculated results of influence may be displayed and/or reported (S80) as desired. In one example as to be illustrated hereafter, a plurality of nodes (each representing a member in the dataset) may be displayed on a display medium for review of the influence thereof by a viewer, where the visual size of the node indicates the member's influence on the dataset. The display medium may additionally incorporate the use of different colors to represent a demographic or other characteristic of the dataset, i.e., assigning nodes different colors. The display medium may further include drawn boundaries between nodes to reflect a domain or website responsible for the influence. In an example, the display medium may be embodied as any of a webpage, pdf, jpeg, tiff, display screen, paper report, etc. In another example as to be illustrated hereafter, influence factor data may be displayed in the form of a graph or table.

Figure 4:
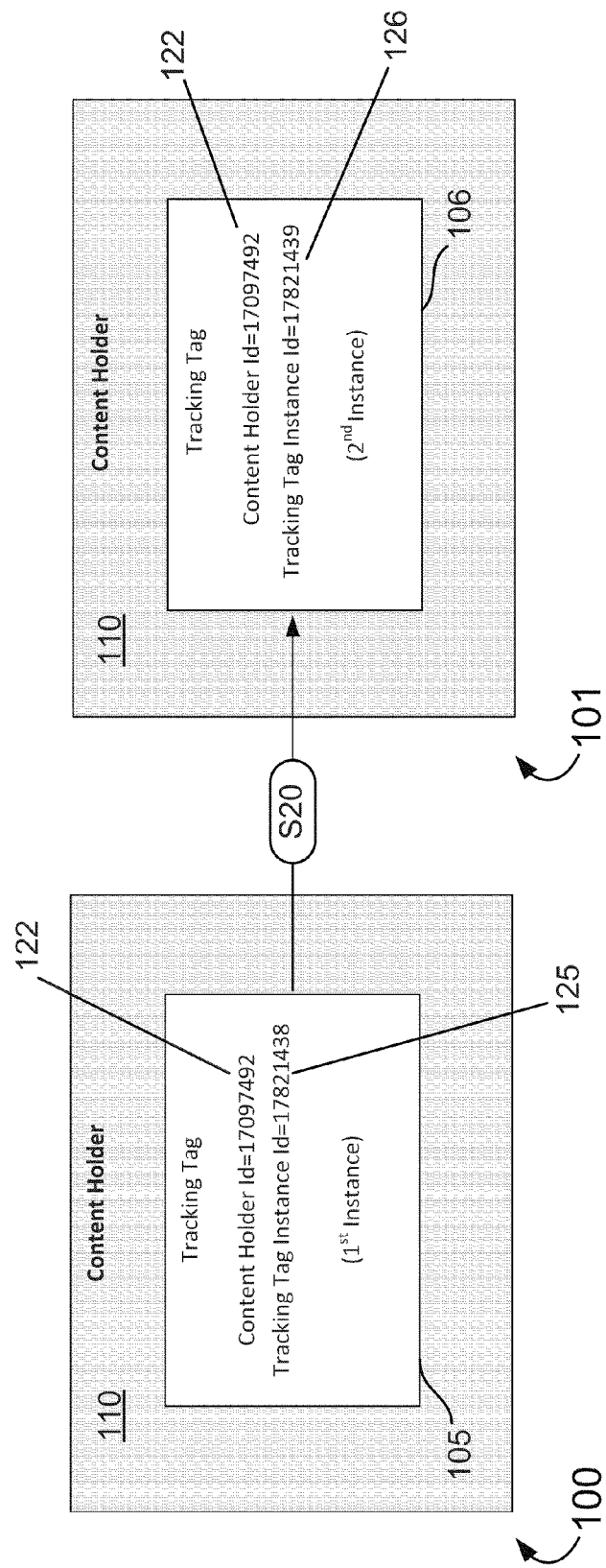
FIG. 4 is a block diagram illustrating the publishing of a single successor node to a new location.
Figure 5:
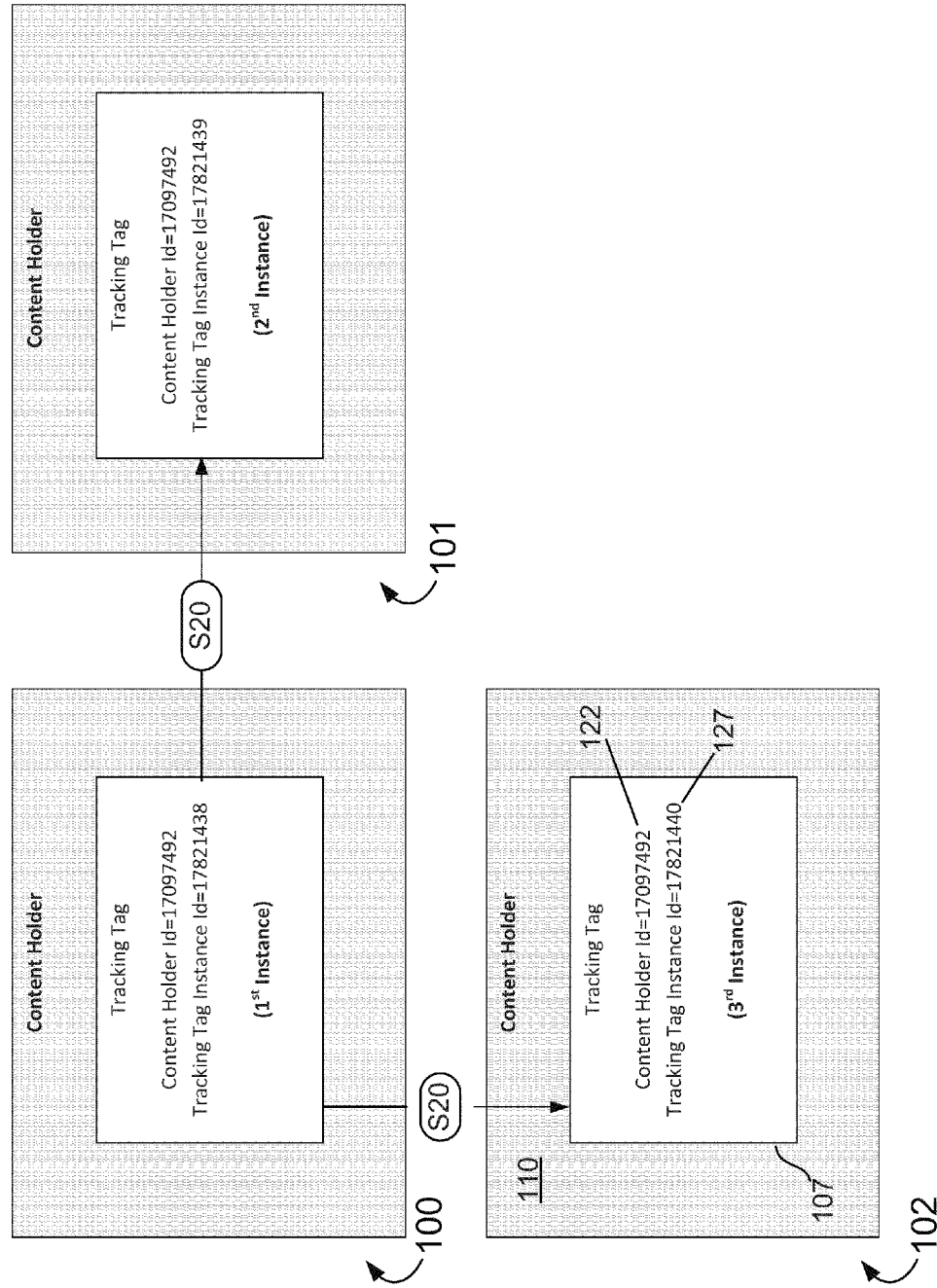
FIG. 5 is a block diagram illustrating the publishing of multiple successor nodes from a single root or originator node.

FIG. 4 is a block diagram illustrating the publishing of a single successor node to a new location; FIG. 5 is a block diagram illustrating the publishing of multiple successor nodes from a single root or originator node; and FIG. 6 is a block diagram illustrating each node's ability to publish multiple successor nodes there from.

Figure 6:
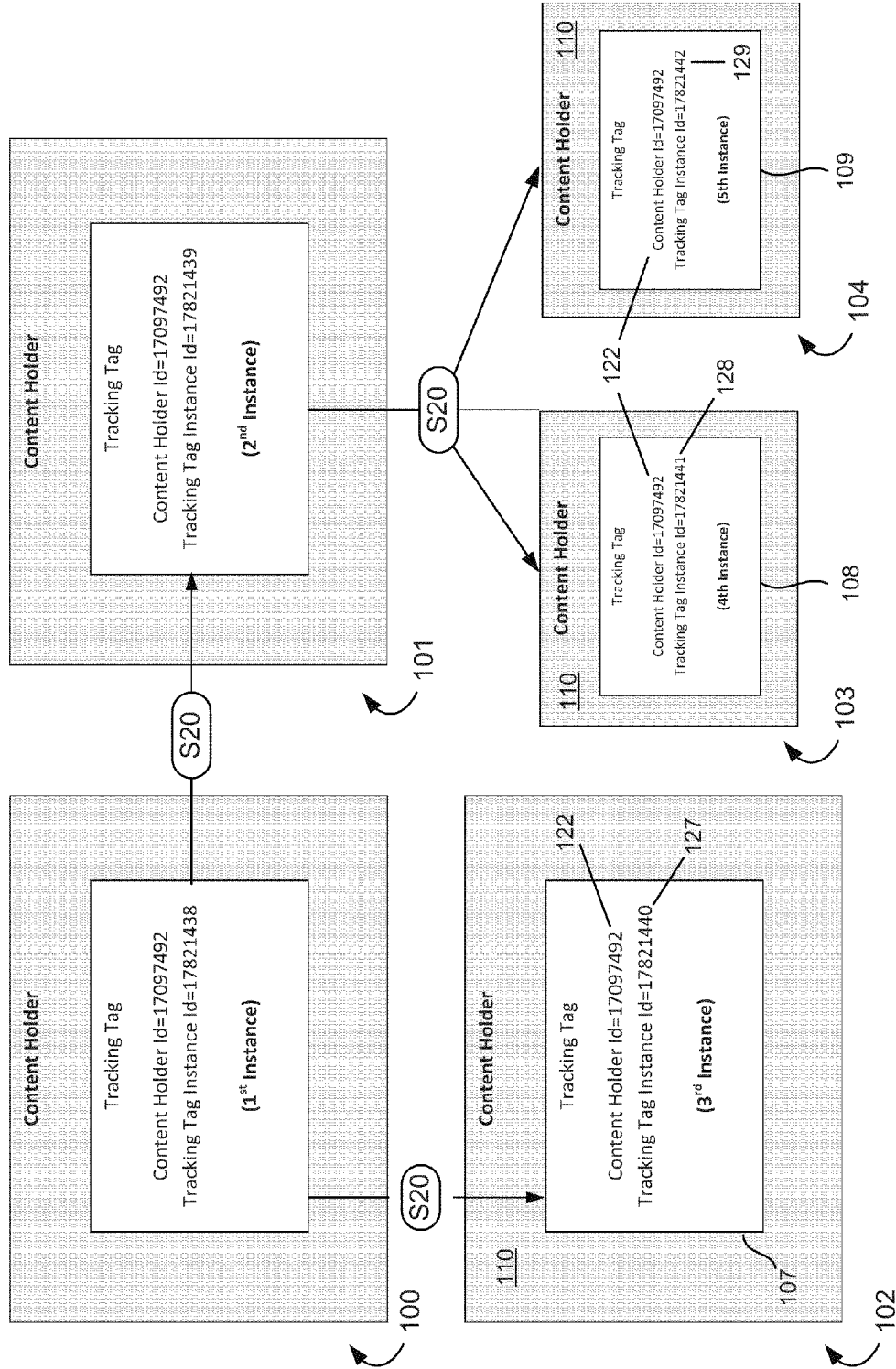

In general, FIGS. 4-6 illustrate step (S20) in more detail as between the root node and successor node, and given successor nodes generating additional successor nodes such that they serve as distinct originator node(s) in their own right. The act of publishing a node to a new location is accomplished by the movement action, i.e., sharing, grabbing, posting, or forwarding the apparatus (content holder, content and tracking tags) via a pre-existing node such as the root node/originator node. As shown in FIG. 4, root node or apparatus 100 (in the $1^{st}$ instance) is composed of its content holder 110 holding some content, and a tracking tag 105 ($1^{st}$ instance). Each node has the ability to generate many successor nodes (FIGS. 5 and 6).

A node's tracking tags, specifically its unique identifier keys, are used to identify the node, follow and capture node placement and interaction. Tracking tags exist in the form of parameter variables serving the source of apparatus 100 or in a tracking image accompanying the apparatus 100. For the apparatus 100, the tracking tag 105 includes two unique identifier keys, or "primary" keys: a Content Holder ID 122 of the root node 100 and a Tracking Tag Instance ID 125. In publishing successor node or apparatus 101, the root node 100 passes on the same content holder 110 with the same content stored therein, and forwards on its Content Holder ID 122. However, the tracking tag 106 of successor node 101 (or apparatus 101 in the $2^{nd}$ instance) is slightly modified; a different Tracking Tag Instance ID 126 is assigned, as this is a second instance of the tracking tag ID. Somewhat similar in FIGS. 5 and 6, for each new successor node 102, 103, 104 ($3^{rd}$, $4^{th}$ and $5^{th}$ instance of the apparatus) published from its originator node, the originator node passes on the same content holder 110 with the same content stored therein, and forwards the original Content Holder ID 122. However, with each new instance of the apparatus, the new node 102, 103, 104 is assigned a new Tracking Tag Instance ID (127, 128, and 129).

FIG. 7 is a code portion illustrating sample tracking tag parameters. As previously noted, tracking tags exist in the form of embedded parameter variables serving the source of the apparatus, or in a tracking image or data packet accompanying the apparatus. In the example of FIG. 7, the encircled portions of code show a tracking tag in the form of parameter variables serving the source of the apparatus.

FIGS. 8A and 8B represent a table illustrating example event codes signifying events for capturing raw data in accordance with the example embodiments; FIG. 9 represents a table illustrating all captured raw event data associated at a single node during a visitor session. FIGS. 8A to 9 are provided to describe step S30 in further detail, in which a central server captures and stores raw data as events are invoked at an apparatus node, which can be an originator node, successor node, etc. Each active node reports unique tracking data to central servers such as raw web traffic data and event data.

The sample captured web traffic data ("raw data") includes unique identifier keys, date and time of the request, the file requested, IP address of visitor, browser type, etc. Raw event data is sent to a central server to log specific events associated with direct and/or indirect human and/or machine interaction with a node. The raw data sent to the central server includes the node's unique keys (primary keys), event codes, data used to describe the event and visitor information, for example.

FIGS. 8A and 8B represent a table illustrating example event codes signifying events for capturing raw data in accordance with the example embodiments; FIGS. 9A through 9C represent a table illustrating all captured raw event data associated at a single node during a visitor session. FIGS. 8A to 9C are provided to describe step S30 in further detail, in which a central server captures and stores raw data as events are invoked at an apparatus node, which can be an originator node, successor node, etc. Each active node reports unique tracking data to central servers such as raw web traffic data and event data.

Referring to FIGS. 9A through 9C (the table is split into three levels due to length of table), the columns denote a number of different data fields that are populated for the session. In a session that lasted 10 minutes, the member underwent 11 different interactions with three different event types. Included in the data fields are the fields of primary keys for the node (Content Holder ID and Placement ID (i.e., Tracking Tag Instance ID)), and fields of the alternate keys for the node (Machine Account ID, Person ID), as well as the date/time, content location, as well as various other non-key data fields.

The following FIGS. 10-17 are referenced hereafter to discuss steps S40 to S60 in greater detail. In general, the raw data captured from the events at all nodes will need to be processed at a suitable processor in a central server. In a general overview, various functions are performed in which the central server assembles the raw data gathered from primary data sources of each of the nodes, assembles the nodes into a tree data structure according to primary keys associated with the apparatus (Content Holder ID, Tracking Tag Instance ID)) which relate back to the originator nodes, aggregates event data at each node as well as data from sibling (successor) nodes, and transforms the tree structure to an alternate data structure, such as a graph, based on the alternate keys (i.e., (Machine Account ID, Person ID)).

To assemble the nodes based on occurrence, a hierarchical tree data structure is formed. In an example, raw data may be input, such as application event logs, as a primary source to assemble the tree data structure. These primary data source inputs may be joined together using node keys from each data source.

Figure 11A:
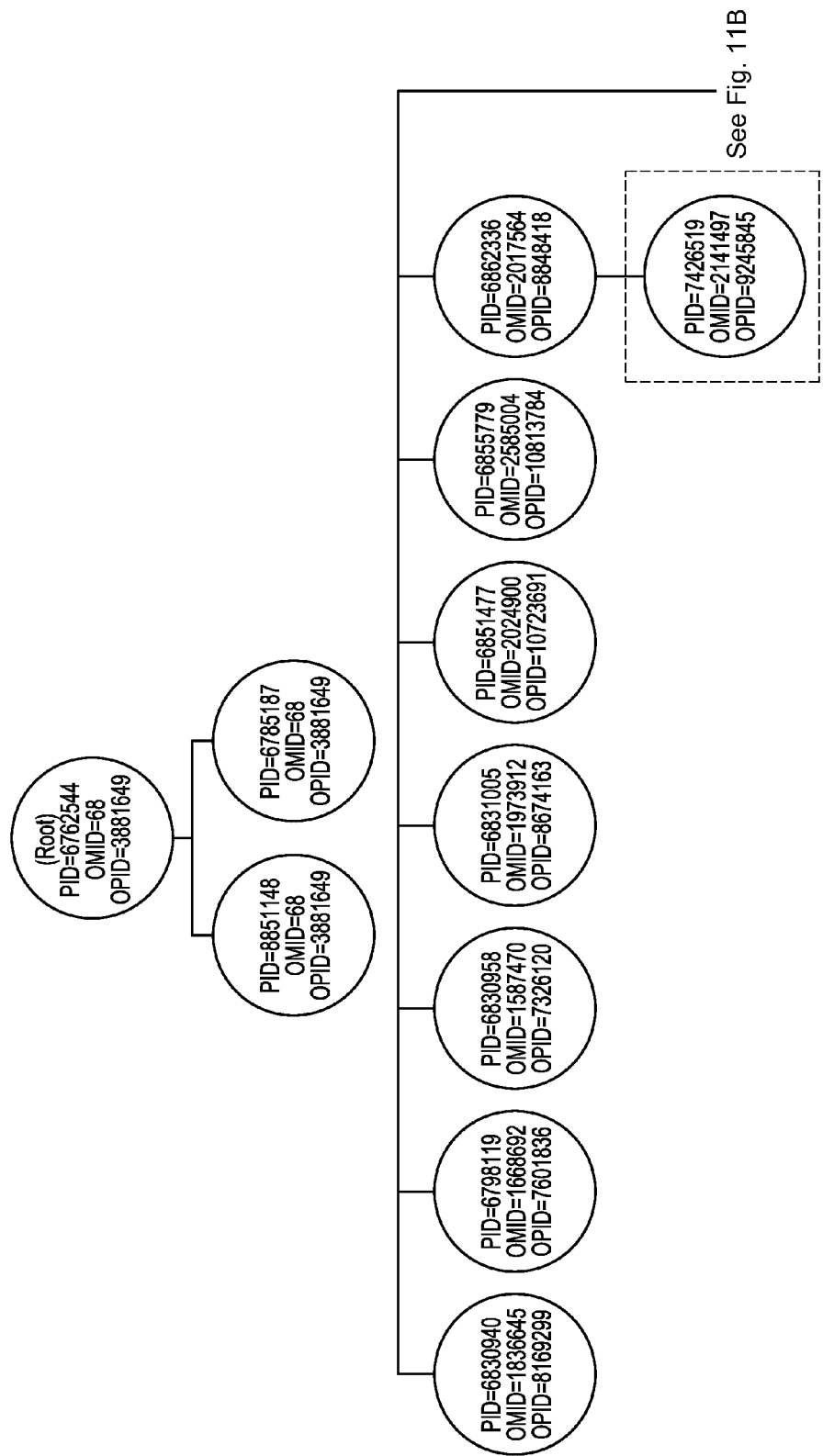
FIGS. 11A and 11B depict a flowchart of an example assembled raw tree data structure based on the data from FIG. 10.
Figure 11B:
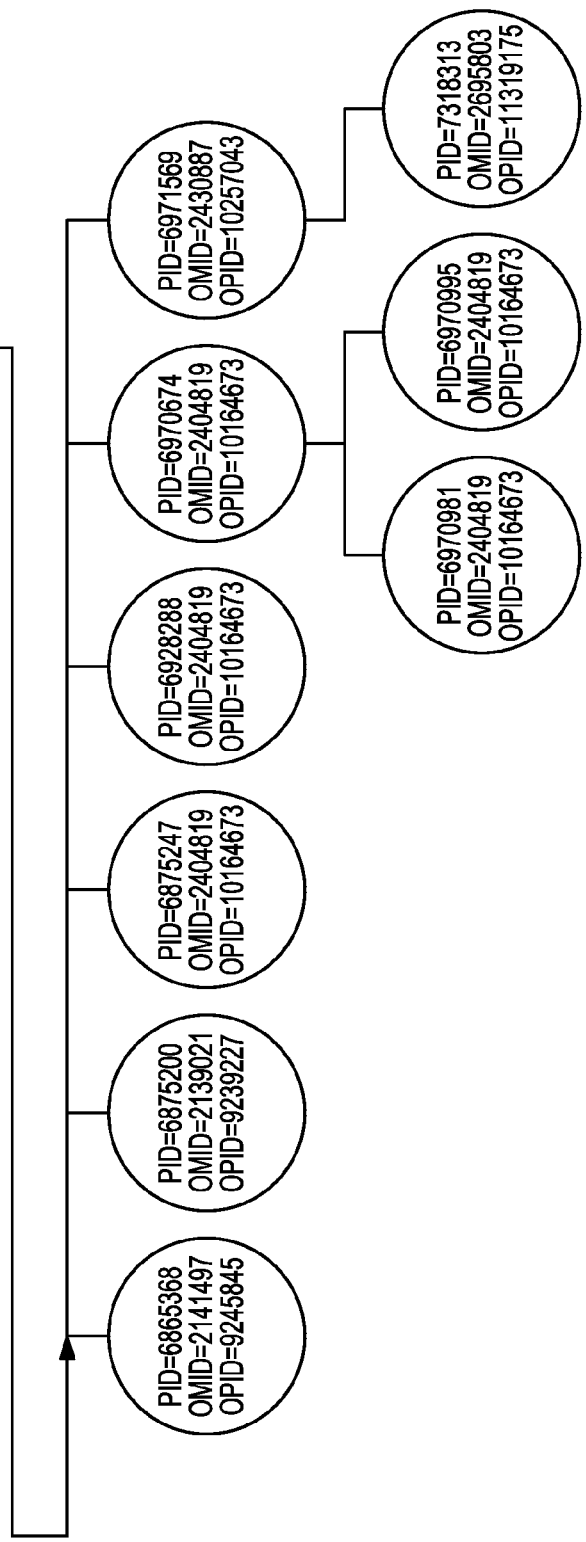

FIG. 10 is a table illustrating example data fields used to assemble the raw tree data structure; FIGS. 11A and 11B depict a flowchart of an example assembled raw tree data structure based on the data from FIG. 10. To assemble the tree data structure and hence to assemble the nodes, the set of linked nodes of the tree in this example are node placements or apparatus instances. With the exception of the root node of the tree (such as root originator node 100 from FIG. 4), each node of the tree has a parent or originator node. Each node in the tree has zero or more children nodes. The depth of a node is the length of the path to the root node.

Each node (originator and/or successor) has primary key fields and non-key data fields. The primary key fields are used to assemble the nodes of the tree structure. The non-key data fields are classified as alternate key fields or alternate data fields. One method used to assemble the relationship between nodes may be accomplished through programmatic code, for example FIG. 10 illustrates an example where the Content Holder ID (in this example called a "widgetId"), placementID (PID—analogous to Tracking Tag Instance ID), and parent-PlacementId (PPID) are primary key fields used to assemble the raw tree data structure. Whereas, the columns "postedBy-MachineId" and "postedByPersonId" represent alternate key data fields. Additionally, the "Depth to Root" field, i.e., the depth of a specific node, is also an alternate data field.

FIGS. 11A and 11B depict a visual representation of the assembled raw tree based on the raw tree node data. As shown in FIGS. 10 and 11, the dotted-line box highlighted a particular node of the raw tree, listing the primary key data field (placementID, PID=7426519) and alternate key data fields (postedByMachineId, OMID=2141497; postedByPersonId, OPID=9245845). This node is a successor of and linked to an originator node by its parentPlacementID, PPID=6862336 (see FIG. 10), which in turn is linked to its own originator node by its parentPlacementID, PPID=6785187 (FIG. 10), which in turn is linked to the root node via PPID=6762544.

With the hierarchical tree data structure assembled, the complete dataset is assembled in order to calculate the influence factor. In assembling the dataset, aggregation of the raw data is performed for the events at each node, as well as aggregation or rollup of sibling event data for each node of the tree.

FIG. 12 is a table illustrating raw aggregated event data occurring at each node across all visitor sessions associated with the node. As described in the data capture step S30, each node of the tree may possess event data associated with the node based on a visitor's session. Each visitor interaction with a specific node results in a visitor session and a collection of events associated with the session. Accordingly, as shown in FIG. 12, event data occurring at each node is aggregated across all visitor sessions associated with the node.

FIG. 13 is a table illustrating raw sibling rollup event data for each node of the tree. Due to the nature of the tree data structure, sibling (successor) node data is also aggregated or "rolled up" at each node. For example, if node A has two (2) occurrences of event code "123" and children {successor} nodes B & C with parent (creator) node A each possess one (1) occurrence of event code "123", the aggregated rollup at node A is 4 total event code "123" occurrences. This rollup method is particularly important in determining which nodes have influenced particular events versus other nodes. Therefore, in addition to aggregating the raw event data for all visitor sessions associated with the node, raw event data for all successor nodes from the creator node is aggregated or rolled up. This is done for each node of the tree. FIG. 13 illustrates an example of the event data that is rolled up from the sibling/successor nodes for each node of the tree.

FIGS. 14A and 14B depict a table of data illustrating an example of joining external, supporting data sources to each node of the tree. External data sources are shown in the table as fields of data which are integrated with the aggregated tree based on common primary and alternate keys. Joining external data sources may expand the metadata and description of each node. Supporting data sources may range from web traffic logs to visitor demographic data to IP geo-location data, etc.

As previously discussed in step S50, an association is made amongst all the creator nodes to assemble the complete dataset. This includes transforming the hierarchical tree structure with the aggregated event data into a graph structure, based on the alternate keys of the nodes which are included as part of the tracking tags at each node.

Accordingly, alternate data keys, other than the primary keys used to construct the tree data structure, may be utilized for the purposes of transforming the tree to alternate data structures such as graphs. For example, this process may be used to transform the original tree data structure (node placement based) to a new data structure based on the alternate keys present in the original tree data structure. The new data structure includes a set of nodes and established relationships (links or connections) between the nodes.

Figure 15A:
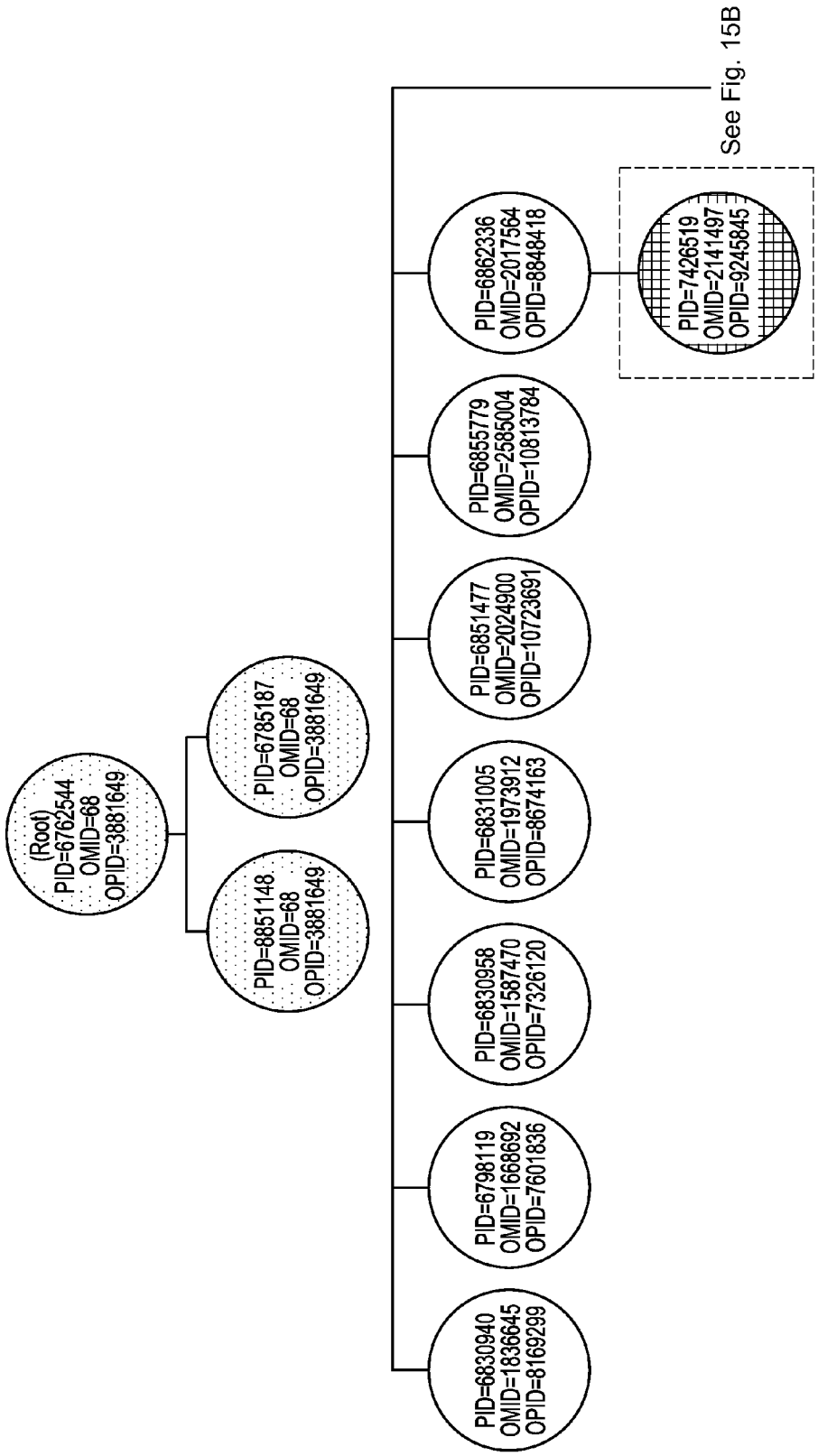
FIGS. 15A and 15B depict a visual representation to illustrate the breakdown of the original tree nodes based on an alternate key(s) such as the originator machine Id ("OMID").
Figure 15B:
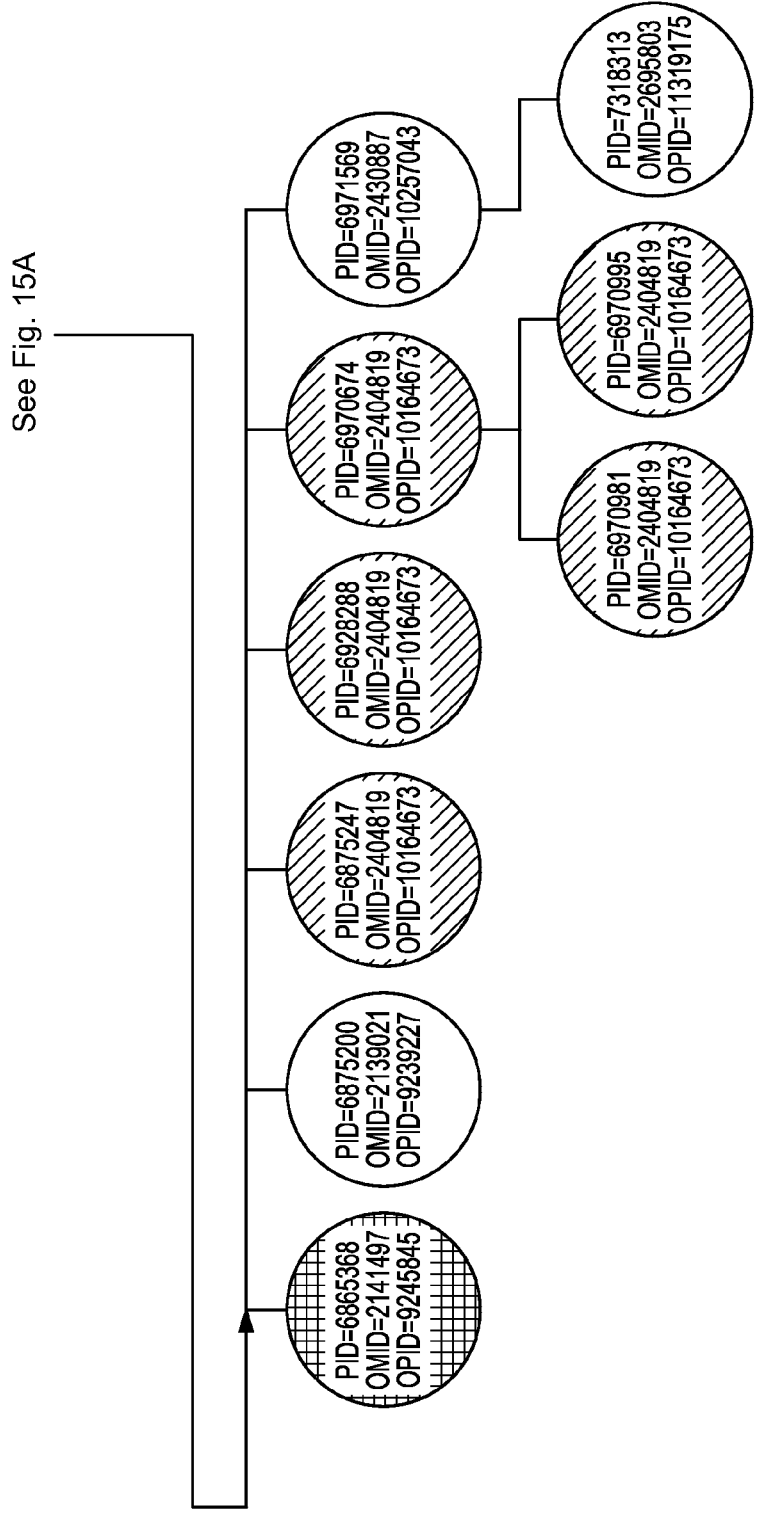

FIGS. 15A-17 illustrate this transformation from tree to graph in more detail to arrive at the complete dataset. Various nodes in these figures are shown with common shaded fill to denote a common alternate key. FIGS. 15A and 15B depict is a visual representation to illustrate the breakdown out of the original tree nodes based on an alternate key(s). In this example, the primary key used to create the nodes of the original tree data structure is the placementID (PID) and the alternate keys used to transform the tree to create the new data structure are the Originating Machine Account Id (OMID) and the Originating Person Account Id (OPID).

FIG. 16 is a table with example node breakout to illustrate relationship of the metadata and aggregated event data to the transformation. Similar to the nodes of the tree data structure, nodes within the graph data structure also possess supporting metadata and aggregated event data associated with the transformation. In the example of FIG. 16, person with OPID=10164673 has originated five (5) unique apparatus placements and all five placements have generated an aggregated total of 417 Event Code "X" Occurrences. Thus, FIG. 16 illustrates this node's aggregated event data including metadata based on person 10164673's apparatus placements, and illustrates node breakouts for two additional members as well (OPIDs=3881649, 9245845).

Figure 17:
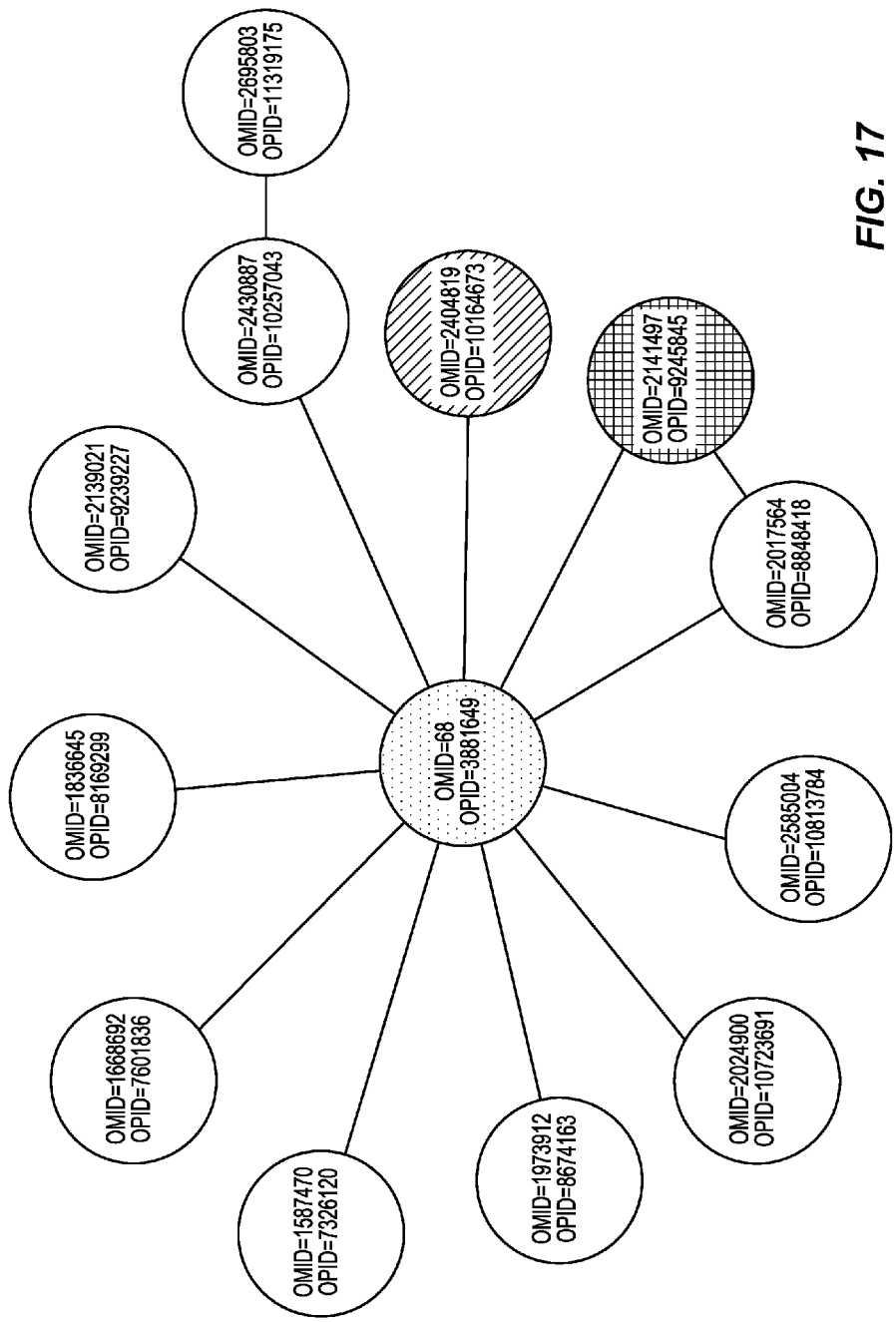
FIG. 17 is a visual representation to illustrate the newly transformed graph.

FIG. 17 is a visual representation to illustrate the newly transformed graph. Each node of the graph data structure represents a unique originator or machine combination and each line connecting nodes represents the relationship those member nodes have with one another, e.g., the link or connection between nodes. Accordingly, since the assembling of the tree generates a dataset from all the instances of the apparatus, the transformation from the tree data structure to the graph converts the dataset from all the instances of the apparatus into a dataset of all the members (such as people/machines) in order to calculate a member's influence.

FIGS. 18 and 19 are provided to describe calculate step S70 in more detail. The complete aggregated dataset is now evaluated to determine the level of influence the nodes play within the overall dataset in which they exist. A node's influence can be defined as either 'simple influence' or 'compound influence' or 'linked node influence'. A node's simple influence is the number of event occurrences transpiring directly at the specific node irrespective of any connected nodes. A node's compound influence is the aggregation or rollup of event occurrences transpiring at the specific node and linked nodes. A node's 'linked node influence' is the aggregation or rollup of event occurrences transpiring at all linked nodes, not at the specific node.

FIG. 18 is a table to illustrate a node's compound influence. In FIG. 18, person 3881649 has 14,057 total event "X" occurrences and person 2024900 has 48 total occurrences. Therefore, it can be concluded that person 3881649 has greater influence than person 2024900.

A node's influence can be derived by dividing the total occurrences of an event at a specific node by the total occurrences of the event in the complete dataset. A node's influence, which may be referred to herein as a "node influence factor" is the node occurrence of the event divided by the total occurrences of the event.

FIG. 19 is a table to illustrate influence factors for various nodes. In FIG. 19, there is shown derived node influence across all nodes based on a primary key(s), in this case unique people and event code "X". Specifically, person 3881649 carries 34.7% of the influence of the total dataset (a 34.7 factor) whereas person 2024900 carries 0.1% influence (a 0.1 factor). The calculated influence thus reflects a member's influence on the dataset. The member may be an individual person, a machine, a website and/or an application, with the influence factor denoting a quantifiable factor that the member exercises over other members of the dataset based on interaction, behavioral and demographic factors, for example.

FIGS. 20-23 are provided to describe the display/report results step S80 in more detail. Both the tree and graph data structures with the resultant calculated relationship and influence in which each node plays in the overall data set may be visually presented as desired to a viewer or user. In an example, the level of influence a node possesses is illustrated by the size or area of the figure representing the node. Therefore, a node possessing less influence than a node with greater influence is represented by a smaller area figure or size than one of greater area.

Figure 20:
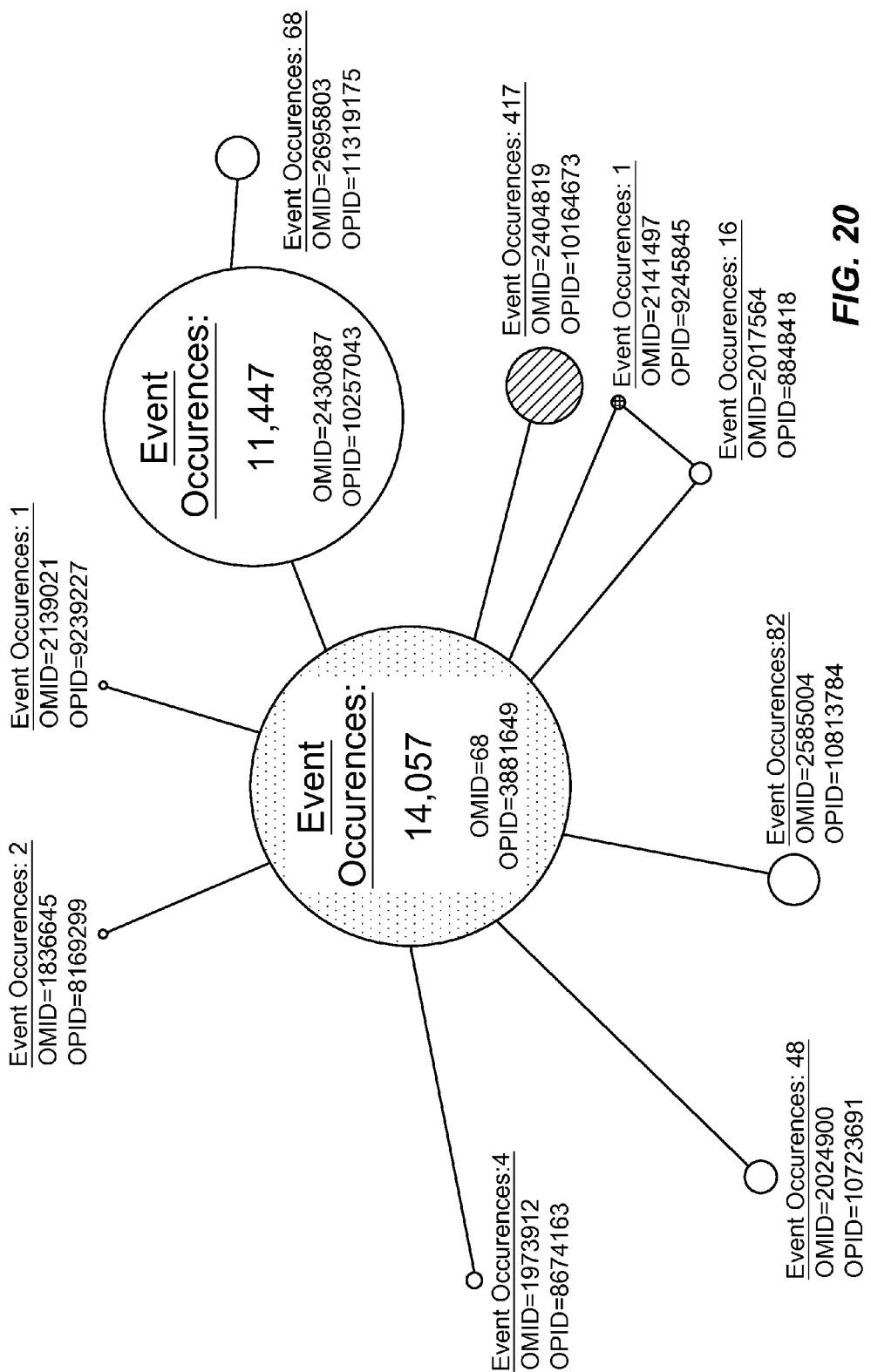
FIG. 20 is visual example of the nodes within a dataset.

FIG. 20 is visual example of the nodes within a dataset. Here, the sizes of the nodes are representative of the influence each node possesses within the context of the data set and its other dataset members. The internal numbers in the node represent statistical data at the node, in this example the Event Code X Successor Rollup at each node. The central node (OMID=68, OPID=3881649) has the largest influence (14, 057) on the dataset and thus has the largest size; a node with OMID=2404819, OPID=10146673 has a medium influence (417) as denoted by its medium-sized circle-size; and the node with OMID=2139021, OPID=9239227 has the smallest influence (1) and hence smallest circle.

As previously noted, a plurality of nodes in the dataset (each representing a member in the dataset) can be displayed, such as on a webpage or other display medium, for example, for review of the influence thereof. In this example, the visual size of the node on the webpage indicates the member's influence on the dataset. The view may additionally incorporate the use of different colors to represent a demographic or other characteristic of the dataset, i.e., assigning nodes different colors. The view may further include drawn boundaries between nodes to reflect a domain or website responsible for the influence.

Figure 21A:
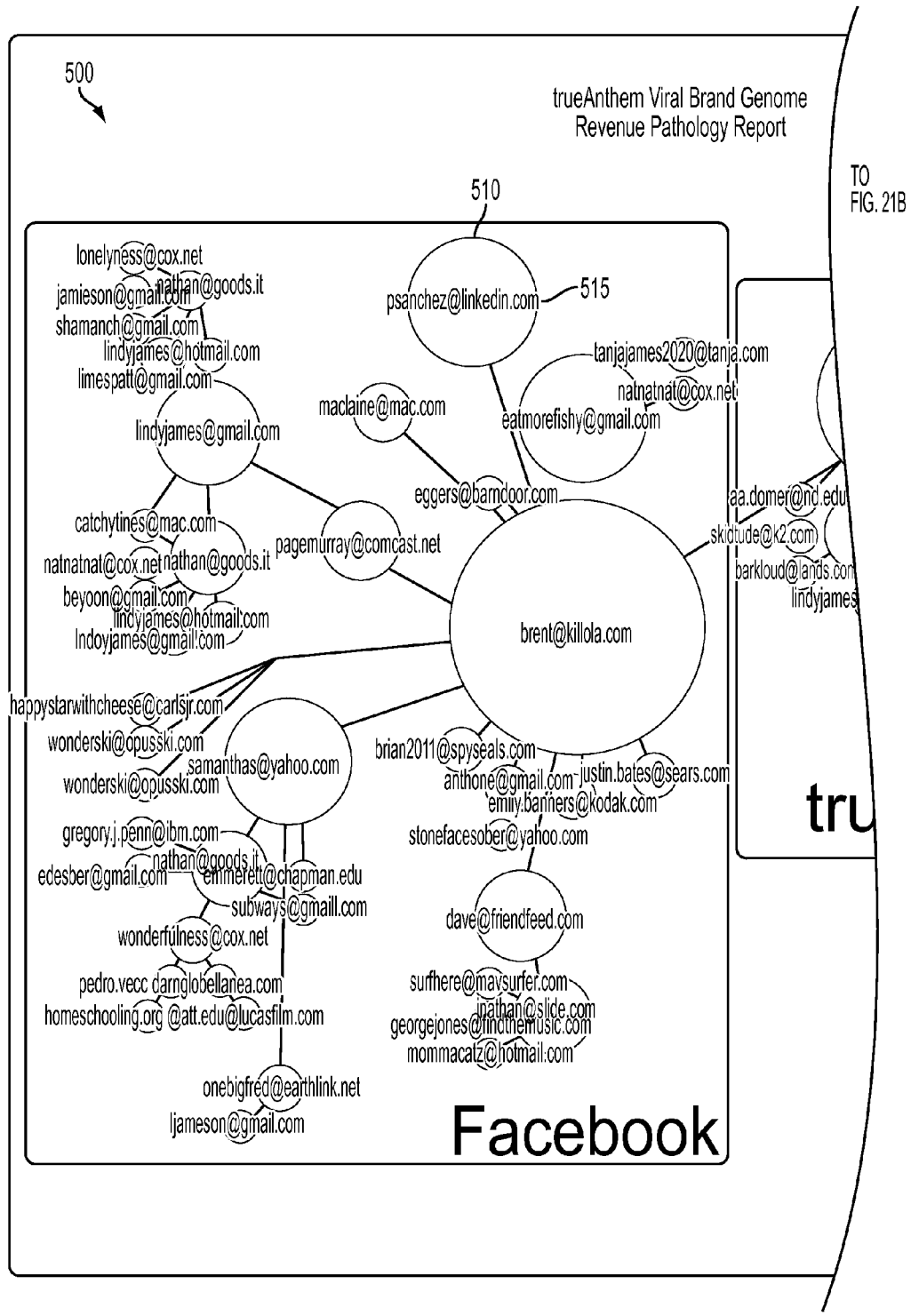
FIGS. 21A and 21B depict a screenshot of a webpage to illustrate an example of the influence nodes possess across a data point in accordance with an example embodiment.
Figure 21B:
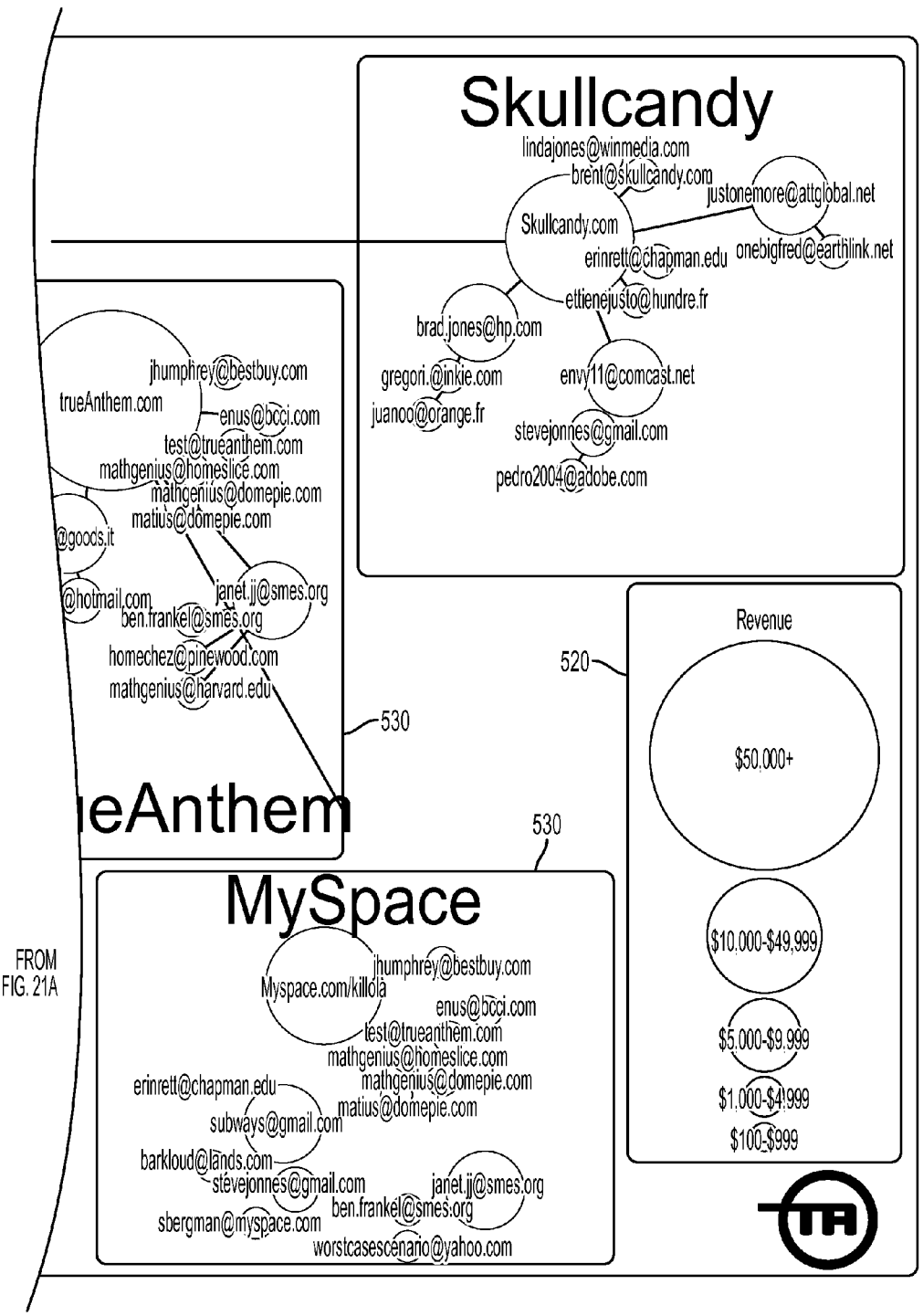

FIGS. 21A and 21B depict a screenshot of a webpage to illustrate an example of the influence nodes possess across a data point in accordance with an example embodiment. In the example, the data point of a webpage 500 is represented as revenue, where each node 510 is representative of a person. The size of each node is represented by the amount of revenue resulting at each node (revenue influence), as best shown in the key 520. The webpage is divided into boundaries 530, where each boundary 530 is representative of a domain or website responsible for the influence. Each node is labeled with the domain name 515 of the person responsible for the influence at that node 510.

Figure 22A:
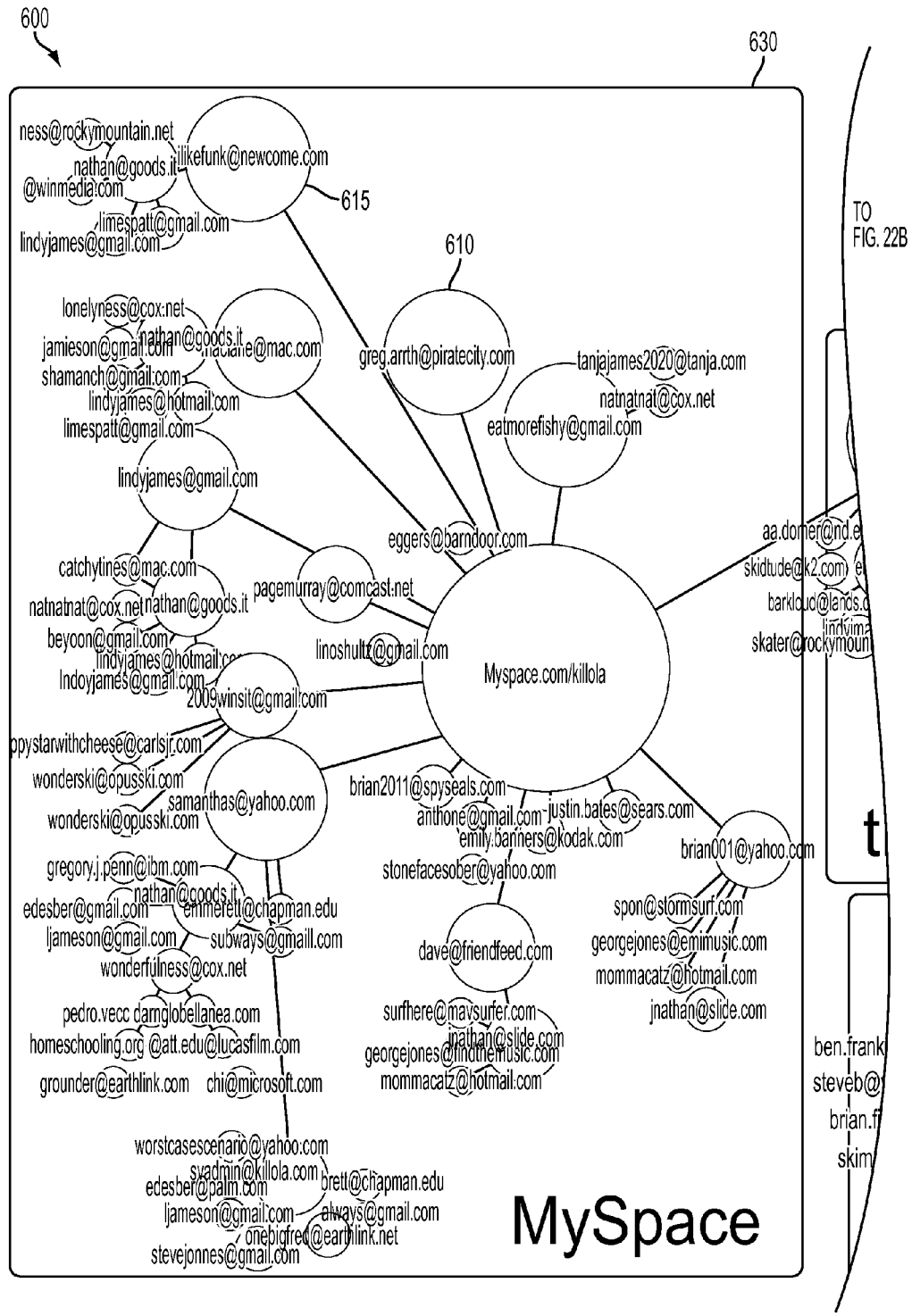
FIGS. 22A and 22B depict a screenshot of a webpage to illustrate an example of the influence nodes possess across a data point in accordance with another example embodiment.
Figure 22B:
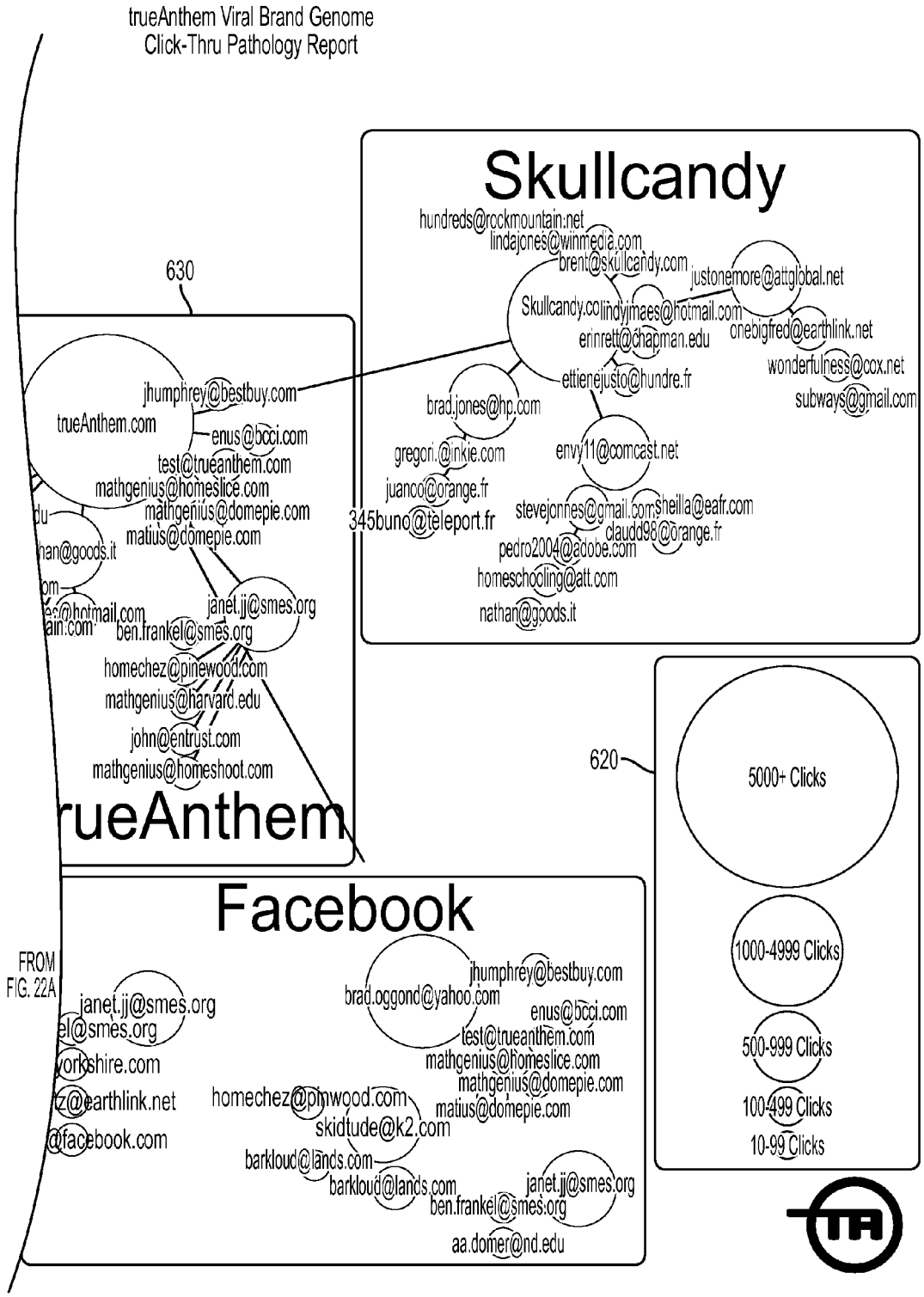

FIGS. 22A and 22B depict a screenshot of a webpage to illustrate an example of the influence nodes possess across a data point in accordance with another example embodiment. In FIG. 22, the data point of a webpage 600 is represented as click-thrus, where each node 610 is representative of a person. The size of each node is represented by the number of clicks resulting at each node (person click thru influence), as best shown in the key 620. The webpage is also divided into boundaries 630, each representative of a domain or website responsible for the influence. Similarly, each node is labeled with the domain name 615 of the person responsible for the influence at that node 610.

Figure 23:
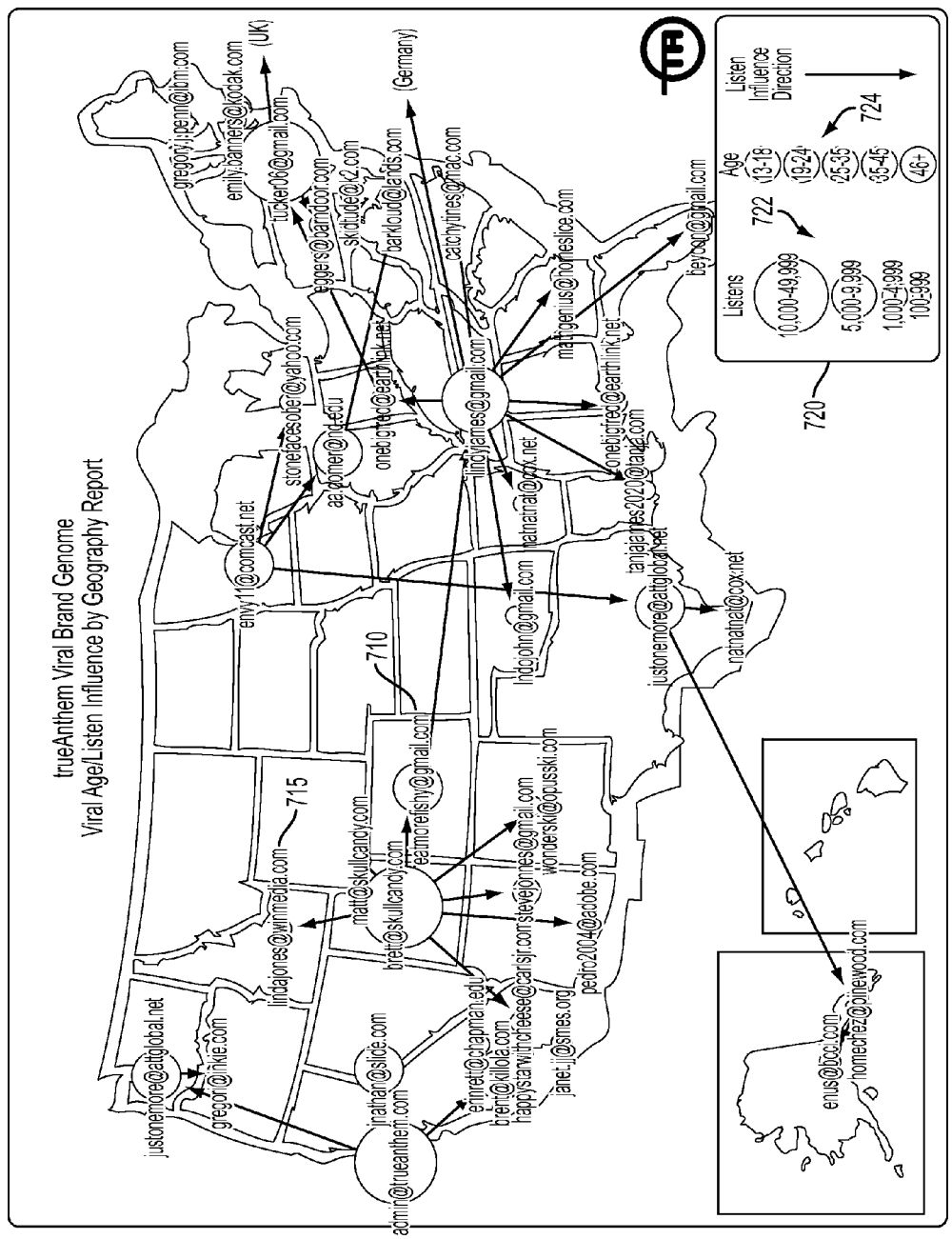
FIG. 23 is a screenshot of a report to illustrate an example of the influence nodes possess across multiple data points in accordance with another example embodiment.

FIG. 23 is a screenshot of a webpage to illustrate an example of the influence nodes possess across multiple data points in accordance with another example embodiment. In FIG. 23, the data points of a webpage 700 are represented as listens and age, where each node 710 is representative of a person. The size of each node is represented by the number of listens resulting at each node (person listen influence), as best shown in the listen sub-key 722 of key 720. Node color is also employed to distinguish demographics or other characteristics of the dataset. In this example, color of the node is represented by the age range of the person, as best seen in the sub-key 724 of key 720. Each node is labeled with the domain name 715 of the person responsible for the influence at that node 710.

The example embodiments being thus described, it will be obvious that the same may be varied in many ways. Such variations are not to be regarded as departure from the example embodiments, and all such modifications as would be obvious to one skilled in the art are intended to be included herein.

What is claimed is:

1. A method of determining influence of a member within an overall dataset in which a plurality of nodes exist, the member represented by one of the nodes in the dataset, comprising:
   providing a root originator node to a location directly or indirectly accessible to a central server, the root originator node embodied by content and one or more tracking tags that identify the root node, the root node having an ability to invoke a movement action resulting in the publishing of a new successor node to a new location directly or indirectly accessible to the central server, the new successor node receiving a new instance of the content and tracking tags referencing a ne'.\' instance of the content, tracking tags that identify the successor node, and an ability to invoke the movement action to generate additional successor nodes,
   wherein the tracking tags further include:
      primary keys to identify the respective node, the primary keys including an instance identifier associated with the tracking tags that are generated by the central server at the root originator node and passed on to linked successor nodes at node generation, and
      alternate keys with additional data associated with the respective node, the alternate keys including a person identifier of the person who caused the respective node to be created or a machine identifier of the originating machine which caused the respective node to be created,
   generating the additional successor nodes by invoking the movement action to pass on a new instance of the content and tracking tags identifying the successor nodes, each additional successor node configured to serve as a distinct originator node for subsequently generated nodes, each subsequently generated node with content and tracking tags identifying the subsequently generated node,
   capturing, by the central server, raw data from one or more events invoked at each node after a node has been generated,
   assembling, by the central server, originator and successor nodes into a tree data structure, wherein assembling nodes further includes:
      assembling the tree structure based on one or more common instance identifiers contained in the primary keys of linked nodes which form the tree, and
      aggregating the captured raw event data for the events at each node, as well as aggregating by rolling up sibling or successor event data for each linked successor node of the tree,
   transforming the tree structure into a new graph data structure from alternate keys present in originator nodes of the tree structure, the alternate keys including at least one of a common person identifier or a common machine identifier therein to provide the new graph data structure with a set of nodes comprising a complete dataset with established connections between all members thereof, each member possessing supporting metadata and aggregated event data associated with the transformation, and calculating an influence factor from the graph data structure that reflects the member's influence within the dataset by dividing the total occurrences of an event at a specific node by the total occurrences of the event in the complete dataset.

2. The method of claim 1, wherein each node in the graph structure represents a member in the dataset, the member selected from a group comprising an individual person, a machine, a website and an application.

3. The method of claim 1, further comprising:
displaying a plurality of nodes in the dataset on a display medium for review of the influence thereof by a viewer.

4. The method of claim 3, wherein the visual size of the node indicates a member's influence within the dataset.

5. The method of claim 3, wherein the display medium includes boundaries between nodes to reflect a grouping or other common characteristic responsible for the influence.

6. The method of claim 3, wherein color of the node represents a demographic or other characteristic of the dataset.

7. The method of claim 1, wherein the movement action to generate a successor node includes one of a sharing, forwarding, posting, installing and passing along of a new instance of the content and tracking tags in order to track the successor node.

8. The method of claim 1, wherein the content is stored within a content holder selected from a group comprising a web widget, electronic mail message, mobile application, rich internet application (RIA), SMS message, MMS message, web application, web page, block of web or video content, block of mobile content, web advertisement, mobile advertisement and desktop application.

9. The method of claim 1, wherein capturing raw data further includes storing raw data as an event at a node and reporting to the central server there from, the event representative of direct or indirect human or automated interaction with the node.

10. The method of claim 1, wherein an event is selected from a group comprising a load action, an open action, a user interaction, a machine interaction, a post of the content, a send of the content, a publish of the content, a share of the content, a listen, a stream, a view, a download, an advertisement impression, an advertisement click, a poll question answered, direct resulted e-commerce, and indirect resulted e-commerce.

11. A method of determining influence of a member within an overall dataset in which a plurality of nodes exist, the member represented by one of the nodes in the dataset, comprising:
publishing a root originator node to a location directly or indirectly accessible to a central server, the root node having content and a plurality of tracking tags comprising primary and alternate keys, creating one or more successor nodes at locations accessible to the central server by the root node performing one of a sharing, forwarding, posting, installing or passing along action of the content and tracking tags identifying the successor nodes in order to publish a successor node to a new location, each of the successor nodes configured to serve as a distinct originator node in generating additional successor nodes with content and tracking tags identifying the additional successor nodes that are linked thereto, wherein the tracking tags further include:
primary keys to identify the respective node, the primary keys including an instance identifier associated with the tracking tags that are generated by the central server at the root originator node and passed on to linked successor nodes at node generation, and alternate keys with additional data associated with the respective node, the alternate keys including a person identifier of the person who caused the respective node to be created or a machine identifier of the originating machine which caused the respective node to be created, generating the additional successor nodes by invoking the movement action to pass on a new instance of the content and tracking tags identifying the successor nodes, each additional successor node configured to serve as a distinct originator node for subsequently generated nodes, each subsequently generated node with content tracking tags identifying the subsequently generated node, capturing, by the central server, raw data from one or more events invoked at each node after a node has been created, assembling, by the central server, the originator and successor nodes into a tree data structure, wherein assembling nodes into the tree structure further includes:
assembling the tree structure based on one or more instance identifiers in the primary keys of linked nodes which form the tree, and aggregating, for each node of the tree structure, the raw data captured from an event at each originator node and rollup event occurrences transpiring at linked successor nodes to form the tree structure with aggregated data, transforming the tree structure into a new graph data structure by aggregating event data based on alternate keys to provide a complete dataset with established connections between all members thereof, each member possessing supporting metadata and aggregated event data associated with the transformation, and calculating an influence factor from the graph data structure reflecting the member's influence within the dataset by dividing the total occurrences of an event at a specific node by the total occurrences of the event in the complete dataset.

12. The method of claim 11, wherein each node of the graph structure represents a member in the dataset, the member selected from a group comprising an individual person, a machine, a website and an application.

13. The method of claim 11, further comprising:
displaying a plurality of nodes in the dataset on a display medium for review of the influence thereof by a viewer.

14. A method of tracking viral spread of content across a plurality of nodes of a dataset to determine influence of a member within the overall dataset, the member represented by one of the nodes in the dataset, comprising:
publishing a root originator node to a location accessible to a central server, the root node having content and a plurality of tracking tags composed of primary and alternate keys identifying the root node, creating one or more successor nodes at locations accessible to the central server by the root node performing a movement action resulting in the publishing of a new successor node with content and tracking tags identifying successor nodes to a new location accessible to the central server, each of the successor nodes configured to serve as a distinct originator node in generating additional successor nodes with content and tracking tags identifying additional successor nodes that are linked thereto, wherein the tracking tags further include:
   primary keys to identify the respective node, the primary keys including an instance identifier associated with the tracking tags that are generated by the central server at the root originator node and passed on to linked successor nodes at node generation, and
   alternate keys with additional data associated with the respective node including a person identifier of the person who caused the respective node to be created or a machine identifier of the originating machine which caused the respective node to be created, generating the additional successor nodes by invoking the movement action to pass on a new instance of the content and tracking tags identifying the successor nodes, each additional successor node configured to serve as a distinct originator node for subsequently generated nodes, each subsequently generated node with content and tracking tags identifying the subsequently generated node, capturing, by the central server, raw data from one or more events invoked at each node after a node has been created, assembling, by the central server, the originator and successor nodes into a tree data structure, wherein assembling nodes further includes:
   assembling the tree structure based on instance identifiers contained in the primary keys of linked nodes which form the tree, and
   aggregating the captured raw event data for the events at each node, as well as aggregating by rolling up sibling or successor event data for each linked successor node of the tree, transforming the tree structure into a new graph data structure by aggregating event data based on alternate keys to provide a new graph data structure with a set of nodes comprising a complete dataset with established connections between all members thereof, each member possessing supporting metadata and aggregated event data associated with the transformation, and calculating an influence factor from the graph data structure reflecting a member's influence within the dataset by dividing the total occurrences of an event at a specific node by the total occurrences of the event in the complete dataset.

15. The method of claim 14, wherein the movement action to generate a successor node includes one of a sharing, forwarding, posting, installing and passing along of a new instance of the content and tracking tags in order to track the successor node.

16. The method of claim 14, wherein the content is stored within a content holder selected from a group comprising a web widget, electronic mail message, mobile application, rich internet application (RIA), SMS message, MMS message, web application, web page, block of web or video content, block of mobile content, web advertisement, mobile advertisement and desktop application.

17. The method of claim 14, wherein an event is selected from a group comprising a load action, an open action, a user interaction, a machine interaction, a post of the content, a send of the content, a publish of the content, a share of the content, a listen, a stream, a view, a download, an advertisement impression, an advertisement click, a poll question answered, direct resulted e-commerce, and indirect resulted e-commerce.

* * * * *